United States Patent
Deane et al.

(10) Patent No.: US 12,487,109 B1
(45) Date of Patent: Dec. 2, 2025

(54) APPARATUS AND METHOD FOR DETERMINING FLUID FLOW AND ALARMING

(71) Applicant: 2SG Technologies LLC, Poway, CA (US)

(72) Inventors: Grant Biden Deane, Poway, CA (US); Malcolm Dale Stokes, La Jolla, CA (US)

(73) Assignee: 2SG TECHNOLOGIES LLC, Poway, CA (US)

( * ) Notice: Subject to any disclaimer, the term of this patent is extended or adjusted under 35 U.S.C. 154(b) by 0 days.

(21) Appl. No.: 19/238,401

(22) Filed: Jun. 14, 2025

(51) Int. Cl.
*G01F 1/69* (2006.01)
*G01F 1/696* (2006.01)
*G01F 15/06* (2022.01)

(52) U.S. Cl.
CPC ................ *G01F 1/69* (2013.01); *G01F 1/696* (2013.01); *G01F 15/068* (2013.01)

(58) Field of Classification Search
CPC ........... G01F 1/69; G01F 1/696; G01F 15/068
See application file for complete search history.

(56) References Cited

U.S. PATENT DOCUMENTS

| | | | |
|---|---|---|---|
| 3,366,942 | A | 1/1968 | Deane |
| 3,388,258 | A | 6/1968 | Grant |
| 3,992,940 | A | 11/1976 | Platzer, Jr. |
| 4,255,968 | A | 3/1981 | Harpster |
| 7,136,761 | B2 | 11/2006 | Henry et al. |
| 7,703,336 | B2 | 4/2010 | Genosar |
| 7,908,931 | B1* | 3/2011 | Dam ..................... G01F 1/7084 73/861.05 |
| 8,395,761 | B2 | 3/2013 | Fulkerson et al. |

(Continued)

FOREIGN PATENT DOCUMENTS

| | | |
|---|---|---|
| CN | 101349583 A | 1/2009 |
| CN | 105371909 A | 3/2016 |

(Continued)

OTHER PUBLICATIONS

N.T. Nguyen, "Micromachined flow sensors—a review", Flow Meas. Instrum., vol. 8, No. 1, pp. 7-16, 1997.

(Continued)

*Primary Examiner* — Laura Martin
*Assistant Examiner* — Anthony M Megna Fuentes
(74) *Attorney, Agent, or Firm* — Kenealy Vaidya LLP

(57) ABSTRACT

A fluid flow measuring/determining apparatus and method can measure fluid flow in a conduit. The apparatus can include a housing including a throughway configured to accept the conduit through which fluid flows, and a thermal source (either cooling or heating source) located adjacent the throughway. Sensors can be positioned adjacent the throughway and spaced symmetrically about the thermal source in upstream and downstream directions. The thermal source can be a pulsed thermal source. A controller can be connected to the sensors and configured to calculate flow rate of the fluid passing through the conduit and alarm when no flow rate or an unprescribed flow rate is detected. Flow rate and alarm characteristic calculation can be dependent on the symmetrical relationship between the sensors about the thermal source and/or the pulsed rate of the thermal source.

20 Claims, 28 Drawing Sheets

(56) References Cited

U.S. PATENT DOCUMENTS

| | | | |
|---|---|---|---|
| 8,423,304 B2 | 4/2013 | Pfau et al. | |
| 8,583,385 B2 | 11/2013 | Pfau et al. | |
| 9,874,467 B2 | 1/2018 | Maginnis et al. | |
| 10,036,143 B2 | 7/2018 | Trescott et al. | |
| 10,151,681 B2 | 12/2018 | Ahmed et al. | |
| 10,345,131 B2 | 7/2019 | Tokuyasu et al. | |
| 11,035,709 B2 | 6/2021 | De Luca et al. | |
| 11,435,211 B2 | 9/2022 | Kippersund et al. | |
| 2003/0056585 A1 | 3/2003 | Furuki et al. | |
| 2007/0131279 A1 | 6/2007 | Thakre et al. | |
| 2009/0115689 A1* | 5/2009 | Mitsutake | G09G 3/18 345/33 |
| 2022/0333966 A1 | 10/2022 | Udrea et al. | |

FOREIGN PATENT DOCUMENTS

| | | |
|---|---|---|
| CN | 105424114 A | 3/2016 |
| CN | 109870205 B | 6/2019 |
| CN | 114930132 A | 8/2022 |
| DE | 102014119556 A1 | 6/2016 |
| DK | 2869039 T3 | 1/2017 |
| GB | 2558895 B | 7/2018 |
| JP | 4081639 B2 | 4/2008 |

OTHER PUBLICATIONS

Tae Hoon Kim, et al. "International Journal of Heat and Mass Transfer", . . . International Journal of Heat and Mass Transfer 52 (2009) 2140-2144.

M. P. Henry, et al., "A self-validating digital Coriolis mass-#ow meter: an overview", Control Engineering Practice 8 (2000) pp. 487-506.

Elsa Batista, et al., "Experimental testing for metrological traceability and accuracy of liquid microflows and microfluidics", Flow Measurement and Instrumentation 71 (2020) 101691, pp. 1-6.

E. Batista, et al., "New EMPIR project—Metrology for Drug Delivery", Flow Measurement and Instrumentation 72 (2020) 101716, pp. 1-5.

F. Ogheard, "Development of an optical measurement method for "sampled" micro-vols. and nano-flow rates", Flow Measurement and Instrumentation 73 (2020) 101746, pp. 1-11.

Elsa Batista, et al., "Development of an experimental setup for microflow measurement using interferometry", Flow Measurement and Instrumentation 75 (2020) 101789, pp. 1-7.

Amin Mojarab, et al., "Design, optimization and numerical simulation of a MicroFlow sensor in the realistic model of human aorta", Flow Measurement and Instrumentation 74 (2020) 101791, pp. 1-7.

Elsa Batista, et al. "Application of the front tracking method in micro flow measuring devices", Measurement: Sensors 23 (2022) 100397, pp. 1-9.

Stephan Klein, et al., "Low liquid flows—an important aspect in medical technology", Biomed. Eng.-Biomed. Tech. 2015; 60(4): 269-270.

Kerstin Thurow, et al., "An Optical Approach for the Determination of Droplet vols. in Nanodispensing", Journal of Automated Methods and Management in Chemistry vol. 2009, Article ID 198732, 10 pages.

Elsa Batista, et al. "Comparison of infusion pumps calibration methods", Meas. Sci. Technol. 28 (2017) 124003 (5pp).

Biotech Liquid Flow Meter, "Monitor and control flow rates continuously in-line your fluidic system without interferences", www.biotechfluidics.com, 4 pages.

Chris Mills, et al., "Calibration methods for flow rates down to 5 nL/min and validation methodology", Biomed. Eng.-Biomed. Tech. 2022, pp. 1-15.

E. Graham et al., "Ultra-low flow rate measurement techniques", Measurement: Sensors 18 (2021) 100279, pp. 1-6.

Real-Time Monitoring of HPLC Pump Performance, www.biotechfluidics.com, 3 pages.

NIST Fluid Metrology Group, 23 pages.

Lief O. Olsen, "Introduction to Liquid Flow Metering and Calibration of Liquid Flowmeters", Institute for Basic Standards National Bureau of Standards, Issued Jun. 1974, 64 pages.

Seok Hwan Lee et al., "Practical methodology for in situ measurement of micro flow rates using laser diode absorption sensors", Metrologia 56 (2019) 045010 (10pp).

Wouter Sparreboom, et al., "Compact Mass Flow Meter Based on a Micro Coriolis Flow Sensor", Micromachines 2013, 4, pp. 22-33; doi:10.3390/mi4010022.

Intek, Inc. 2010 Manual No. A2 100606 Re v. B, www.Manuelslib.com, 59 pages.

Rheotherm® Thermal Flow Measurement, Technical Information, INTEK, Inc., www.intekflow.com, 2 pages.

Rheotherm® Flow Instruments, Transducer Selection Guide, INTEK, Inc., www.intekflow.com, 1 page.

LD20-0600L Liquid Flow Sensor, Single-Use Liquid Flow Sensor for Biomedical Applications, SENSIRION, Version 1—Apr. 2021, 18 pages.

* cited by examiner

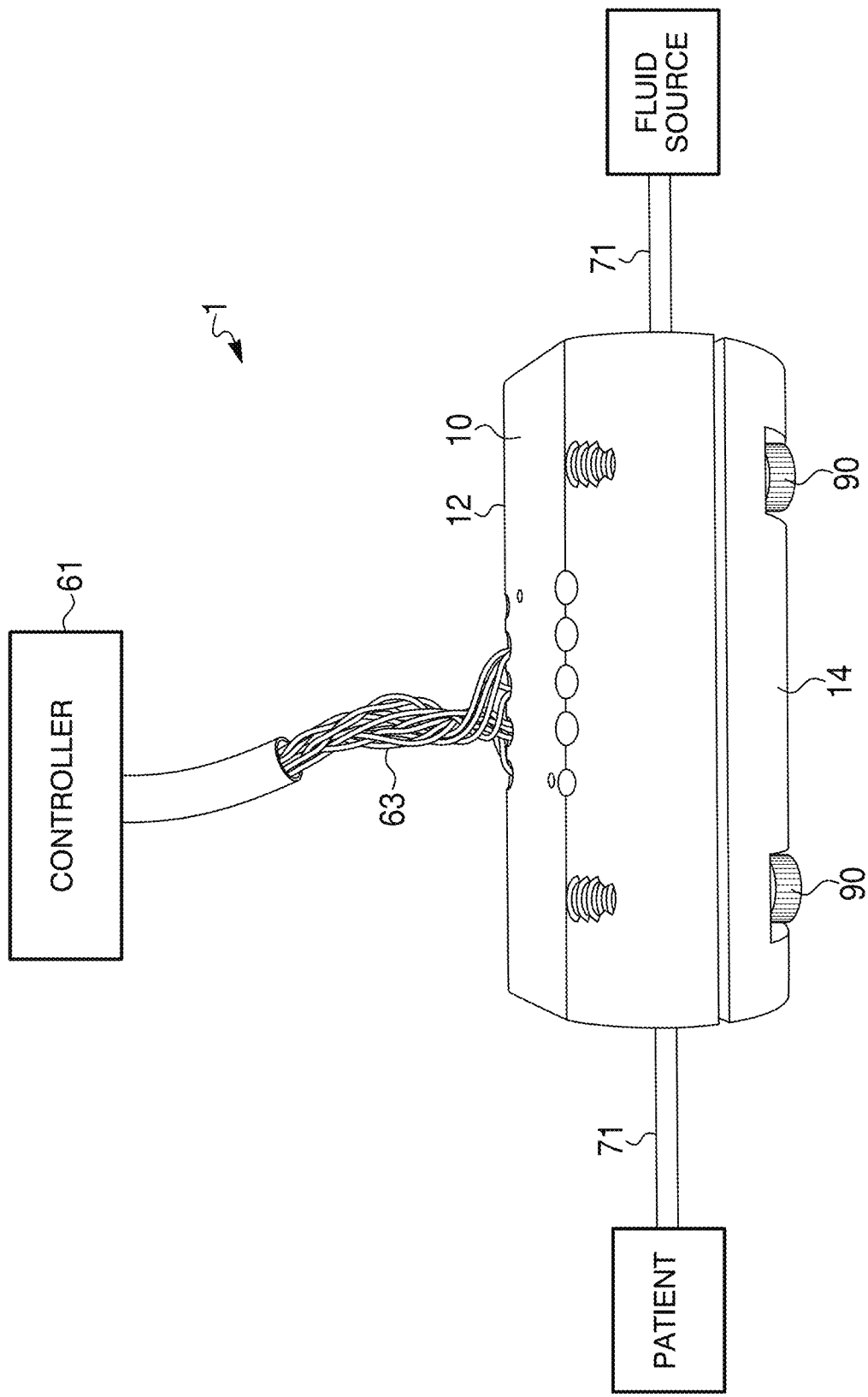

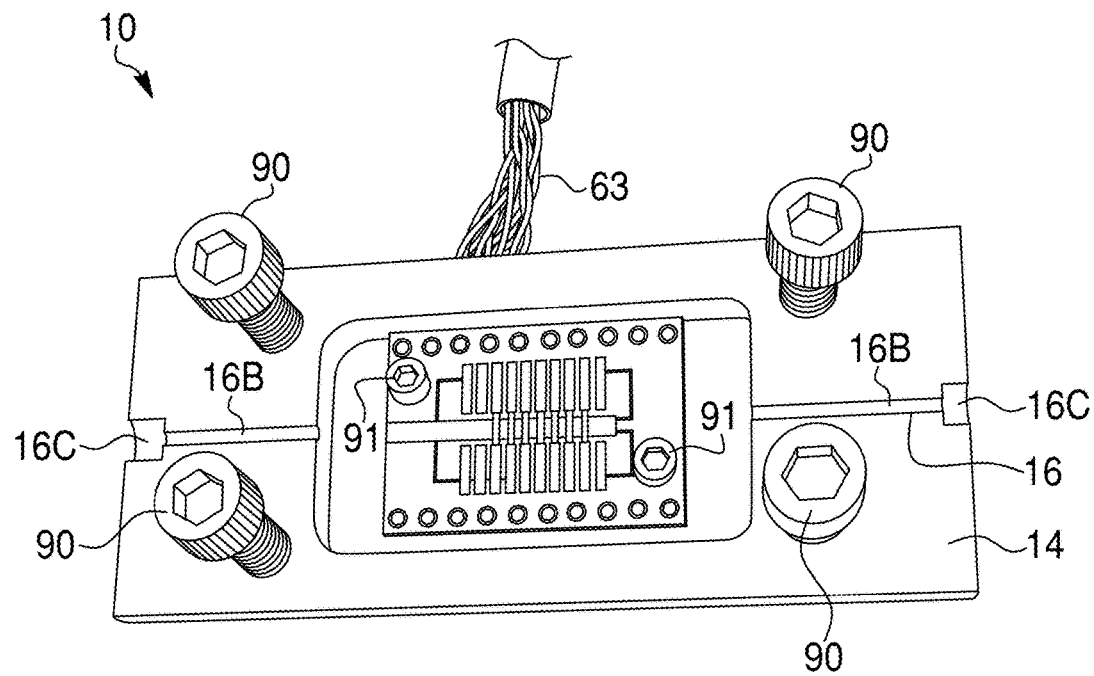
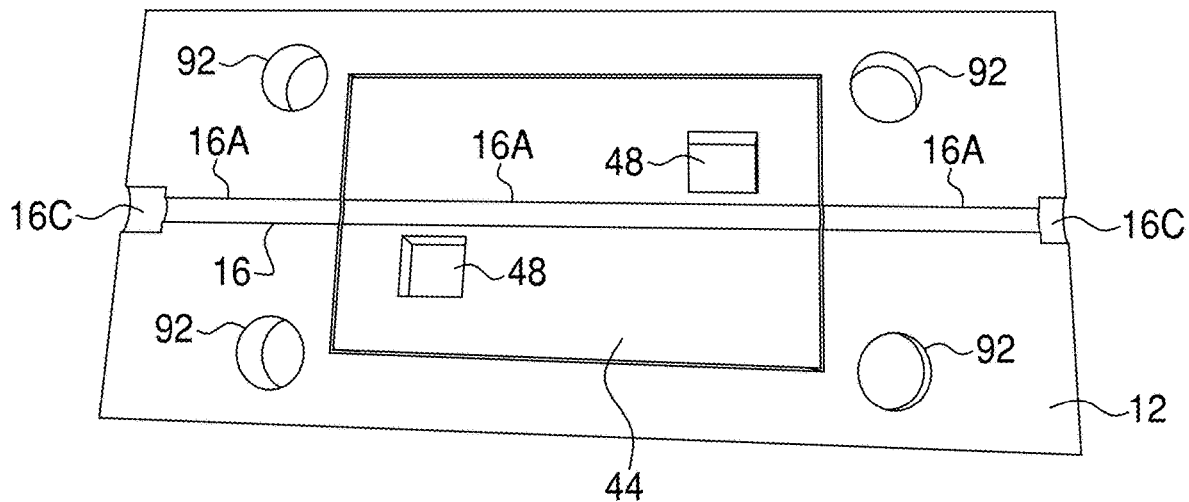
FIG. 6

Fig. 18

1800 ("sample" data table)

| sample_data_table | | | | | | | |
|---|---|---|---|---|---|---|---|
| Sample_# | Time_# | Temp_A | Temp_B | Temp_C | Temp_D | Temp_E | Temp_F |
| 1 | 0 | 25.8075 | 25.7320 | 25.7076 | 25.6579 | 25.6158 | 25.6747 |
| 2 | 2 | 25.8152 | 25.7327 | 25.7091 | 25.6592 | 25.6168 | 25.6128 |
| 3 | 4 | 25.8183 | 25.7325 | 25.7107 | 25.6596 | 25.6172 | 25.6868 |
| 4 | 6 | 25.8210 | 25.7331 | 25.7128 | 25.6603 | 25.6184 | 25.6889 |
| 5 | 8 | 25.8221 | 25.7324 | 25.7153 | 25.6632 | 25.6187 | 25.6905 |
| 6 | 10 | 25.8228 | 25.7333 | 25.7194 | 25.6652 | 25.6192 | 25.6909 |
| 7 | 12 | 0 | 0 | 0 | 0 | 0 | 0 |

1800DR' (data record)
1800DR
1801DR
1802DR
1803DR
1804DR
1805DR
1806DR
1807DR

1801': Data fields are not populated (in this data record since such temperature data has not yet been collected 1802': Temperature observed in current sample #6

Fig. 19

1900 ("delta temperature" data table)

Delta_temperature_data_table

| Sample_# | Delta_A-B | Delta_B-C | Delta_C-D | Delta_D-E | Delta_E-F |
|---|---|---|---|---|---|
| 1 | 0.0755 | 0.0244 | 0.0497 | 0.0421 | -0.0589 |
| 2 | 0.0825 | 0.0236 | 0.0499 | 0.0424 | 0.0040 |
| 3 | 0.0858 | 0.0218 | 0.0511 | 0.0424 | -0.0696 |
| 4 | 0.0879 | 0.0203 | 0.0525 | 0.0419 | -0.0705 |
| 5 | 0.0897 | 0.0171 | 0.0521 | 0.0445 | -0.0718 |
| 6 | 0.0895 | 0.0139 | 0.0542 | 0.0460 | -0.0717 |
| 7 | 0 | 0 | 0 | 0 | 0 |

- 1900DR' (data record)
- 1900DR
- 1901DR
- 1902DR
- 1903DR
- 1904DR
- 1905DR
- 1906DR
- 1907DR 1901: This data is derived from Table 1800 (Fig. 18)

For example, this table shows data taken 20 seconds after heat pulse.
• Delta values of each trial (e.g. Trial 1, 50, 51, 52, 53, 54, 55) are compared with corresponding delta values of the observed data to determine which trial has the closest match (to the observed data).

2100 ("delta temperature" data table)

(data record) 2100R

Known_Trial_Data_Table

| Trial # | Flow rate of known sample ML/min | Delta_A-B | Delta_B-C | Delta_C-D | Delta_D-E | Delta_E-F |
|---------|----------------------------------|-----------|-----------|-----------|-----------|-----------|
| 1       | 0.1                              | ###       | ###       | ###       | ###       | ###       |
| ⋮       |                                  |           |           |           |           |           |
| 50      | 5.0                              | ###       | ###       | ###       | ###       | ###       |
| 51      | 5.1                              | ###       | ###       | ###       | ###       | ###       |
| 52      | 5.2                              | ###       | ###       | ###       | ###       | ###       |
| 53      | 5.3                              | ###       | ###       | ###       | ###       | ###       |
| 54      | 5.4                              | ###       | ###       | ###       | ###       | ###       |
| 55      | 5.5                              | ###       | ###       | ###       | ###       | ###       |

2100"

The indicia ### represents a delta value between the particular sensors. For example, if the input temperature of (TA=73.4) and the input temperature of (TB=73.9, then the delta value between such two thermistors would be 0.5)

APPARATUS AND METHOD FOR DETERMINING FLUID FLOW AND ALARMING

BACKGROUND

Summary

The disclosed subject matter relates to apparatuses and methods for determining and/or measuring fluid flow in a conduit such as a tube or pipe, and for alarming when at least one predetermined condition is detected, such as a partial or total occlusion of the fluid in the conduit, reversal of fluid flow, incorrect fluid flow, as well as other conditions. More particularly, the disclosed subject matter relates to apparatuses and methods that can measure with high accuracy small flows of fluid within a tube or conduit, such as a small dose of a pharmaceutical delivered via intravenous tubing and alarming when the prescribed dosing of the pharmaceutical is not being accurately delivered (for example, when no fluid flow is detected in the conduit).

Some embodiments are directed to a fluid flow measuring apparatus configured to detect a characteristic of fluid flow in a tube when the tube is located in the fluid flow measuring apparatus. The apparatus can include: a housing including a throughway configured to accept the tube; a thermal source located in the housing and adjacent the throughway; a first sensor positioned adjacent the throughway and spaced from the thermal source in an upstream direction; a second sensor positioned adjacent the throughway and spaced from the thermal source in a downstream direction such that the thermal source is located between the first sensor and second sensor, and the first sensor and second sensor are symmetrically located about the thermal source; and a controller connected to the first sensor and second sensor and configured to detect a characteristic of the fluid flow in the tube, wherein detection is dependent on the symmetrical relationship between the first sensor and the second sensor about the thermal source, the controller further configured to initiate an alarm signal when the characteristic of the fluid flow is an alarm characteristic of the fluid flow.

Some embodiments are directed to a fluid method for determining a characteristic of fluid flow in a tube. The method can include: providing a housing including a through-hole into which a tube is locatable, the housing including a thermal source located adjacent the through-hole, at least one upstream sensor located upstream of the thermal source and adjacent the through-hole, and at least one downstream sensor located downstream of the thermal source and adjacent the through-hole, the at least one upstream sensor and the at least one downstream sensor being positioned symmetrically about the thermal source; causing the thermal source to pulse thermal energy; measuring temperature at the upstream sensor to determine a change in temperature over time at the upstream sensor; measuring temperature at the downstream sensor to determine a change in temperature over time at the downstream sensor; determining the characteristic of fluid flow within the tube using, the change in temperature over time at the upstream sensor, and the change in temperature over time at the downstream sensor; and causing an alarm signal to be initiated when the characteristic of fluid flow in the tube corresponds to an alarm characteristic.

Some embodiments are directed to a fluid flow measuring apparatus configured to detect a characteristic of fluid flow in a tube when the tube is located in the fluid flow measuring apparatus. The fluid flow measuring apparatus can include: a housing including a throughway configured to accept the tube; a thermal source located adjacent the throughway; a first temperature sensor positioned adjacent the throughway and spaced from the thermal source in an upstream direction; a second temperature sensor positioned adjacent the throughway and spaced from the thermal source in a downstream direction such that the thermal source is located between the first temperature sensor and second temperature sensor; and a controller connected to the thermal source, the first temperature sensor, and the second temperature sensor, wherein the controller is configured to provide pulsed power to the thermal source such that the thermal source provides one of heating and cooling to the tube for a first time period, and is turned off for a second period of time, the controller is further configured to determine the characteristic of the fluid flow based on a temperature variance sensed by the first temperature sensor over time and a temperature variance sensed by the second temperature sensor over time, and the controller is configured to initiate an alarm signal when the characteristic of the fluid flow determined by the controller is an alarm characteristic of the fluid flow.

BRIEF DESCRIPTION OF THE DRAWINGS

The disclosed subject matter of the present application will now be described in more detail with reference to exemplary embodiments of the apparatuses and methods, given by way of example, and with reference to the accompanying drawings, in which:

FIG. 4 is a side schematic view of a fluid flow measuring apparatus made in accordance with principles of the disclosed subject matter.

FIG. 6 is a top disassembled view of the fluid flow measuring apparatus of FIG. 5 with a communication line extending thereto.

FIG. 18 is a schematic diagram showing a sample data, in accordance with principles of the disclosure.

FIG. 19 is a schematic diagram showing a delta temperature data table, in accordance with principles of the disclosure.

FIG. 22B is a further schematic diagram showing select components of the flow sensor system of FIG. 22, in accordance with principles of the disclosure.

DETAILED DESCRIPTION OF EXEMPLARY EMBODIMENTS

Figure 1A:
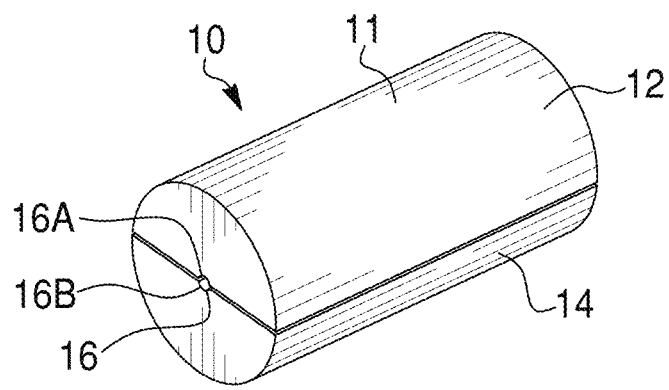
FIGS. 1A-1D are a perspective view, end view, top view, and side view, respectively, of a fluid flow measuring apparatus made in accordance with principles of the disclosed subject matter.
Figure 1B:
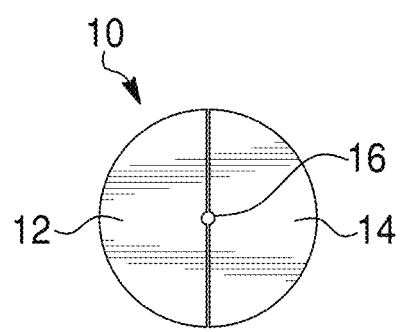
Figure 1C:
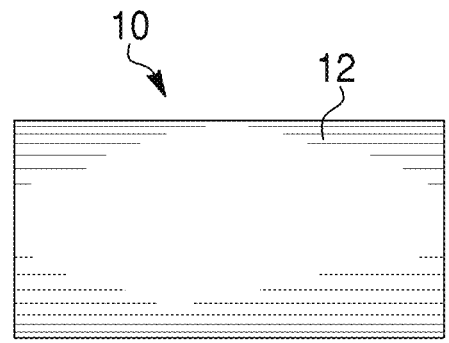
Figure 1D:
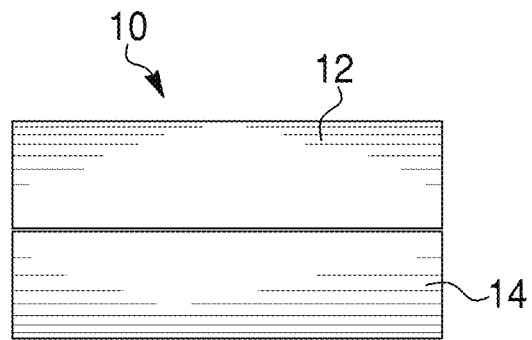

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows.

FIGS. 1A-1D depict an embodiment of a fluid flow measuring apparatus made in accordance with principles of the disclosed subject matter. The fluid flow measuring apparatus can be configured as aa sensor device 10 having a housing 11 including an upper shell 12 and a lower shell 14 through which a through-hole 16 extends along a central axis thereof. The upper shell 12 and lower shell 14 can be configured as a heat sink/thermal buffer/stabilizer to ensure the sensor device 10 can maintain a constant temperature within its interior and allow any tubing or conduit and fluid within any tubing or conduit placed in the through-hole to maintain a constant temperature. For example, each shell 12, 14 can be made from aluminum. In this embodiment, the upper shell 12 can be connected to the lower shell 14 through various connective structures or methods, for example, by screws, clamps, clips, hinge, or by adhesive, or by magnetic properties of the upper shell 12 relative to the lower shell 14, or combinations thereof. The channel or through-hole 16 in the sensor device 10 can be formed as cylindrical opening extending from end-to-end through the entirety of the body of the sensor device 10. The through-hole 16 can be formed from an upper half 16A convex surface (channel) in the upper shell 12 that mates with a lower half 16B convex surface (channel) in the lower shell 14 such that when the upper shell 12 and lower shell 14 are joined together, the upper half 16A and lower half 16B form the cylindrically shaped through-hole 16. The through-hole 16 can be configured to closely mate with a tube or conduit that runs through the sensor device 10.

FIGS. 2A-2D depict an embodiment of the lower shell 16B of the sensor 10 of FIGS. 1A-1D. The lower shell 14 can include a concavity 14A in which a circuit board 41 is mounted on an insulation element 40. A mounting board 42 can be an integral portion of the circuit board 41 or insulation element 40, or can be attached or adhered to one or both of the circuit board 41 and/or insulation element 40. The circuit board 41 and mounting board 42 can have a thermal conductance lower than a thermal conductance of the upper shell 12 and lower shell 14 such that the upper shell 12 and lower shell 14 act as a "thermal buffer and stabilizer" (hereinafter referred to as a heat sink) with sufficient thermal mass to isolate its interior from variations in the temperature of the surrounding environment on timescales up to several minutes and also to allow any tubing or conduit and fluid within any tubing or conduit placed in the through-hole to attain a constant temperature before reaching the sensing element.

If desired, the mounting board 42 can be configured without the circuit board, and merely be a structure that supports the sensors 30A-F and thermal source 20 in proper alignment within the sensor device 10. Sensors 30A-F can be mounted to the mounting board 42 by adhesive, solder, welding or other method or structure for attachment. Similarly, a thermal source 20 can be mounted to the mounting board 42 by adhesive, solder, welding or other method or structure for attachment. The insulation element 40 (and 44 in the upper shell 12) serve to isolate the mounting board 42, sensors 30A-F and thermal element 20 from the surrounding environment.

Figure 2A:
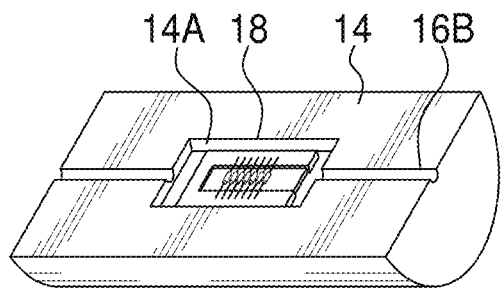
FIG. 2A is a perspective view of a bottom portion of the fluid flow measuring apparatus of FIGS. 1A-1D.
Figure 2B:
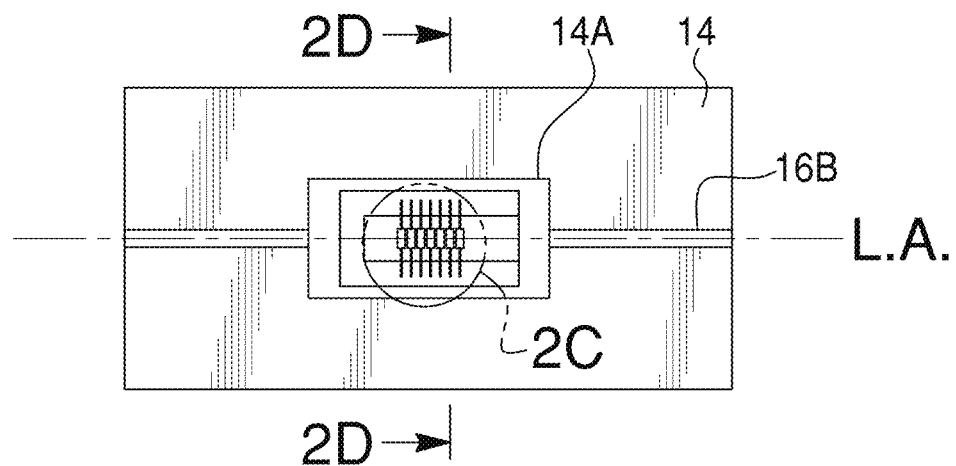
FIG. 2B is a top view of the bottom portion of the fluid flow measuring apparatus of FIG. 2A.
Figure 2C:
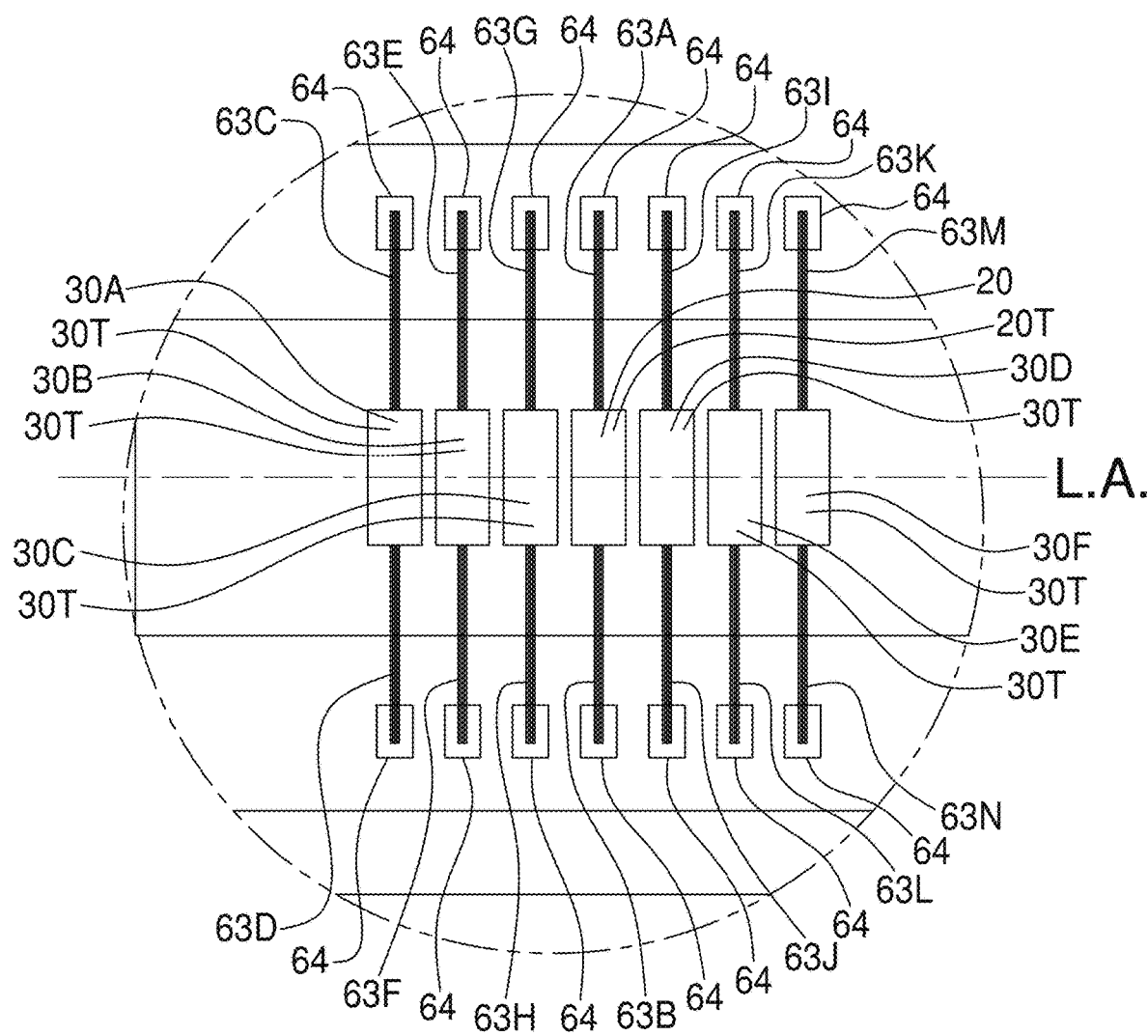
FIG. 2C is a close up view of area 2C of FIG. 2B.
Figure 2D:
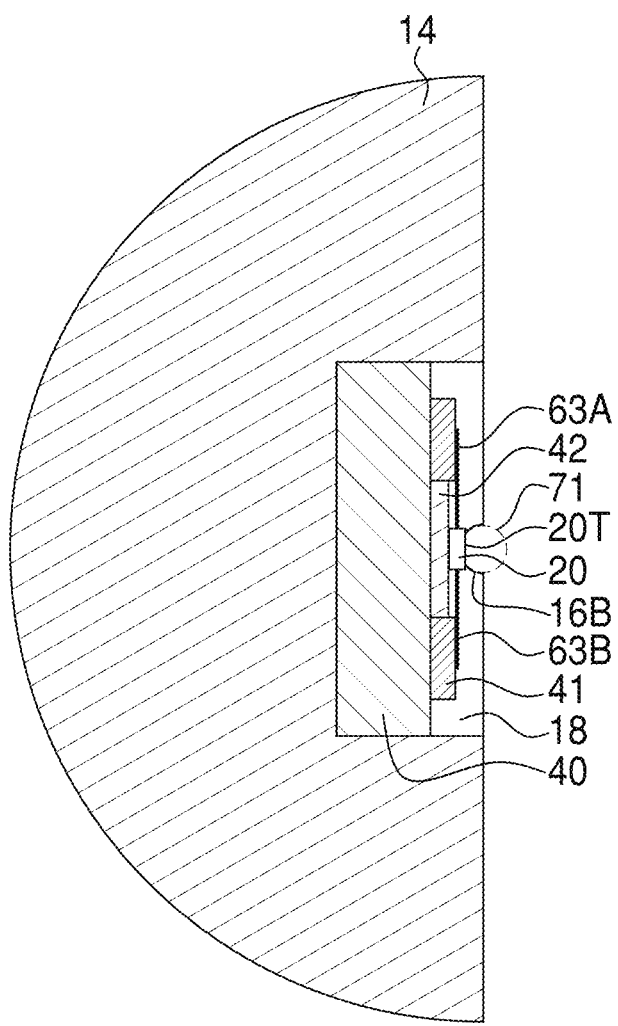
FIG. 2D is cross-sectional view taken along line 2D-2D of FIG. 2B.

In the embodiment shown in FIGS. 2B and 2C, the sensors 30A-F and thermal source 20 are aligned such that a central axis in a widthwise direction for each of the sensors 30A-F and thermal source 20 is parallel with the longitudinal axis L.A. of sensor device 10. In this case, the longitudinal axis L.A. of the sensor device 10 is coincident with a central axis of a conduit 71 when mounted in the sensor device 10. In addition, the longitudinal axis L.A. of the sensor device 10 and central axis of conduit 71 are coincident with a central axis of a flow path for fluid that travels within conduit 71.

When the sensor device 10 is configured as a flow measurement sensor for pharmaceutical delivery, the conduit 71 can be configured as an intravenous (IV) line. Specifically, the IV line can be a peripheral IV lines, catheter, or cannula that is configured as an indwelling single-lumen plastic conduit that allow fluids, medications and other therapies such as blood products to be introduced directly into a peripheral vein of a patient. The sensor device 10 is particularly well adapted for use in pediatric pharmaceutical delivery in which the diameter of the conduit 71 is small and the amount of drug, blood, nutrient, or other fluid delivery over time is also relatively small. Alternatively, the conduit 71 can be configured as a peripherally inserted central catheter line (PICC line) which is typically thicker and more durable than a regular IV line. The conduit 71 can also be made from other materials such as metals or ceramics for other applications such as gas flow sensing and other chemical delivery mechanisms.

Returning to FIG. 2D, insulation element 40 and mounting board 42 can be configured such that when each of the sensors 30A-F and thermal source 20 are mounted on the mounting board 42, a top surface of each of the sensors 30A-F and thermal source 20 can lie within a same plane, or are substantially co-planar such that they are all in equal forceful contact with the conduit 71 when the conduit is installed in the sensor device 10. The top surface of each of the sensors 30A-F and the top surface 20T of the thermal source 20 face away from the mounting board 42 and shell 14 such that they are sandwiched between the conduit 71 and mounting board 42 when the conduit is installed in the sensor device 10. Alternatively, the top surfaces 30AT-30FT of each of the sensors 30A-F and the top surface 20T of the thermal source 20 can all (or subsets thereof) be located in different planes. For example, thermal source 20 can be mounted on upper shell 12 of housing 11 and have a top surface 20T that faces towards the longitudinal axis of the lower half through hole 16B when sensor device 10 is configured for operation, while top surface(s) 30AT-30FT face towards the longitudinal axis of the upper half though hole 16A when sensor device 10 is configured for operation. It is also conceivable that any of the surfaces 30AT-30FT and 20T be located about any radial position about conduit 71 when the sensor device 10 is configured for operation provided they are accurately positioned along the lengthwise position in a symmetrical manner and achieve uniform contact with conduit 71 at a known or predictable force against the conduit 71. The sensors 30A-F and thermal source 20 can be connected to the mounting board 42 by adhesives, welding, soldering, or via other known connection structure or method. Further, the mounting board 42 can be adjustably connected to the circuit board 41 and/or insulator 40 such that the plane that contains the top surfaces of each of the sensors 30A-F and thermal source 20 can be adjusted either during manufacture or during repair or use of the sensor device 10. Thus, a predictable contact (equal pressure and force against the conduit 71) can be maintained between the sensors 30A-F and thermal source 20 and the conduit 71. The adjustability can be achieved by changing relative thicknesses of the mounting board 42 and/or insulator 40, or by connecting the mounting board 42 to the circuit board 41 at varying locations.

It is also contemplated that two (or more) pairs of sensors 30 can be spaced equidistance from the thermal source 20 (in the longitudinal axis direction of the through-hole 16), and face each other such that the conduit 71 is located directly between a pair of sensors located upstream of the thermal source 20 and directly between a pair of sensors located downstream of the thermal source 20.

In FIG. 2C, the relative spacing between each of the sensors 30A-F and the thermal source 20 along the longitudinal axis LA direction is shown. In particular, the thermal source 20 is shown at a central location along the longitudinal axis LA direction. Sensors 30C and 30D are shown spaced to the left and right of the thermal source 20 along the longitudinal axis LA direction. A distance X between sensor 30C and the thermal source 20 can be equal to a distance X' between sensor 30D and the thermal source 20 such that the sensors 30C and 30D are symmetrically situated about the thermal source 20. Likewise, a distance Y between sensor 30B and the thermal source 20 can be equal to the distance Y' between sensor 30E and the thermal source 20 such that the sensors 30B and 30E are symmetrically situated about the thermal source 20. In addition, the distance Z between sensor 30A and the thermal source 20 can be equal to the distance Z' between sensor 30F and the thermal source 20 such that the sensors 30A and 30F are symmetrically situated about the thermal source 20. The distances X, Y, and Z can be equal to each other or different, provided the sensors 30A-F are symmetrically spaced about the thermal source 20 long the longitudinal axis LA direction. The sensors 30A-F and the thermal source 20 can be centered with respect to each other in directions perpendicular to the longitudinal axis LA direction. In other words, in FIG. 2C, a center of each of the sensors 30A-F and the thermal source 20 is located on the line L.A. representing the longitudinal axis direction, and in FIG. 2D the front surface, back surface, top surface, and bottom surface of each of the sensors 30D-F and the thermal source 20 lie within a same front surface plane, back surface plane, top surface plane, and bottom surface plane, respectively. (Sensors 30A-C are not shown in FIG. 2D but can include similarly situated front surfaces, back surfaces, top surfaces, and bottom surfaces such that all of the respective front surfaces, back surfaces, top surfaces, and bottom surfaces are coplanar). The spacing between each of the sensors 30A-F along the longitudinal axis L.A. direction can be the same, as shown in FIG. 2C, or can be different provided they are symmetrically spaced about the thermal source 20.

Whiskers 63A and 63B can each extend from a contact connection on the thermal source 20 to a respective wire pad 64 on the circuit board 41 (or other mount structure). Likewise, whiskers 63C and 63N can each extend from a contact connection on the each of the sensors 30A-F to a respective wire pad 64 on the circuit board 41. The whiskers 63A-N can be formed of electrically conductive material with or without a non-conductive sheath, and be connected to each of the sensors 30A-F, thermal source, and wire pads in a known manner, such as via solder connection, adhesive, welding or other known connection structure or method. Because whiskers 63A-N not only conduct electricity, but also conduct heat, the whiskers 63A-N can have a very small diameter to prevent heat conduction while permitting electrical conduction. In particular, the diameter of each whisker can be 0.002 mm$^2$. The diameter of each whisker can also be less than. 0.01 mm$^2$ and still accomplish the functions contemplated herein.

Figure 3A:
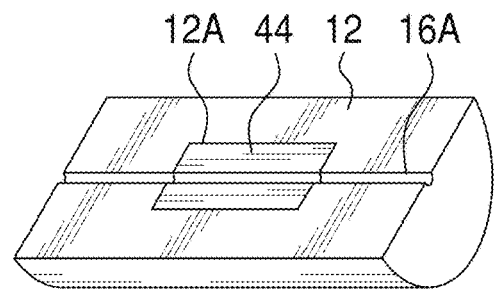
FIG. 3A is a perspective view of a top portion of the fluid flow measuring apparatus of FIGS. 1A-1D.
Figure 3B:
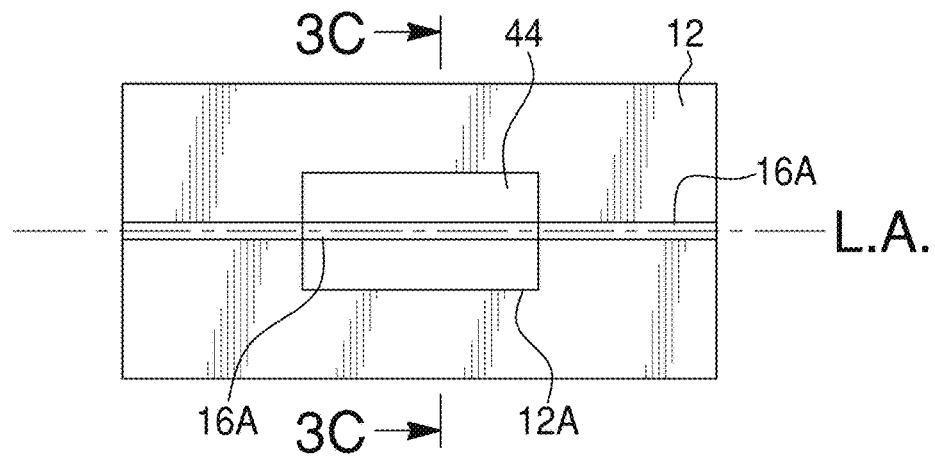
FIG. 3B is a bottom view of the top portion of the fluid flow measuring apparatus of FIG. 3A.
Figure 3C:
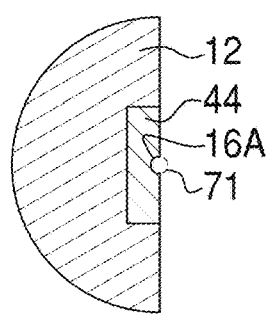
FIG. 3C is cross-sectional view taken along line 3C-3C of FIG. 3B.

FIGS. 3A-C depict the upper shell 12 of the sensor device 10. The upper shell 12 can include an insulation element 44 located within a cavity 12A in the upper shell 12. When the upper shell 12 is connected to the lower shell 14 with conduit 71 located therebetween, the conduit 71 resides in the upper half 16A of through-hole 16 that runs as a trough-like semicylindrical indent in both the insulation element 44 and the two areas of the shell 12 that surround the insulation element 44.

FIG. 4 is a side schematic view of an embodiment of a sensor assembly that incudes sensor device 10 connected via wires 63 to controller 61. Conduit 71 can extend from a fluid source (e.g., an IV bag, pharmaceutical container, nutrient container, chemical container, or other fluid source) via the through-hole 16 in the sensor device 10 to a patient (or other destination, such as a collection container). In this embodiment, the upper shell 12 is connected to the lower shell 14 via screws 90 to ensure a tight fit about the conduit 71 which then ensures a consistent and predictable force and surface area contact between the conduit 71 and the sensors 30A-F and thermal source 20. The channels (upper half 16A and lower half 16B) that extend through the housing define the through hole 16 play a critical role in the alignment of the tubing or conduit 71 with respect to the sensors 30A-F and thermal source 20. The dimensioning of these structures should be precise for repeatability, which can be facilitated by the manufacturing tolerances for the channels 16A, 16B, or by using internal alignment posts or blocks or clips, adhesives, or other structures or materials that ensures that the tube alignment is correct. For example, a plurality of posts can run along each side of channel 16A and a plurality of recesses can run along each side of channel 16B (or vice versa). The posts can precisely guide and secure the conduit 71 onto and in the housing 11 while the recesses can accept the posts therein when mating the upper shell 12 to the lower shell 14 that form sensor housing 11.

Figure 5:
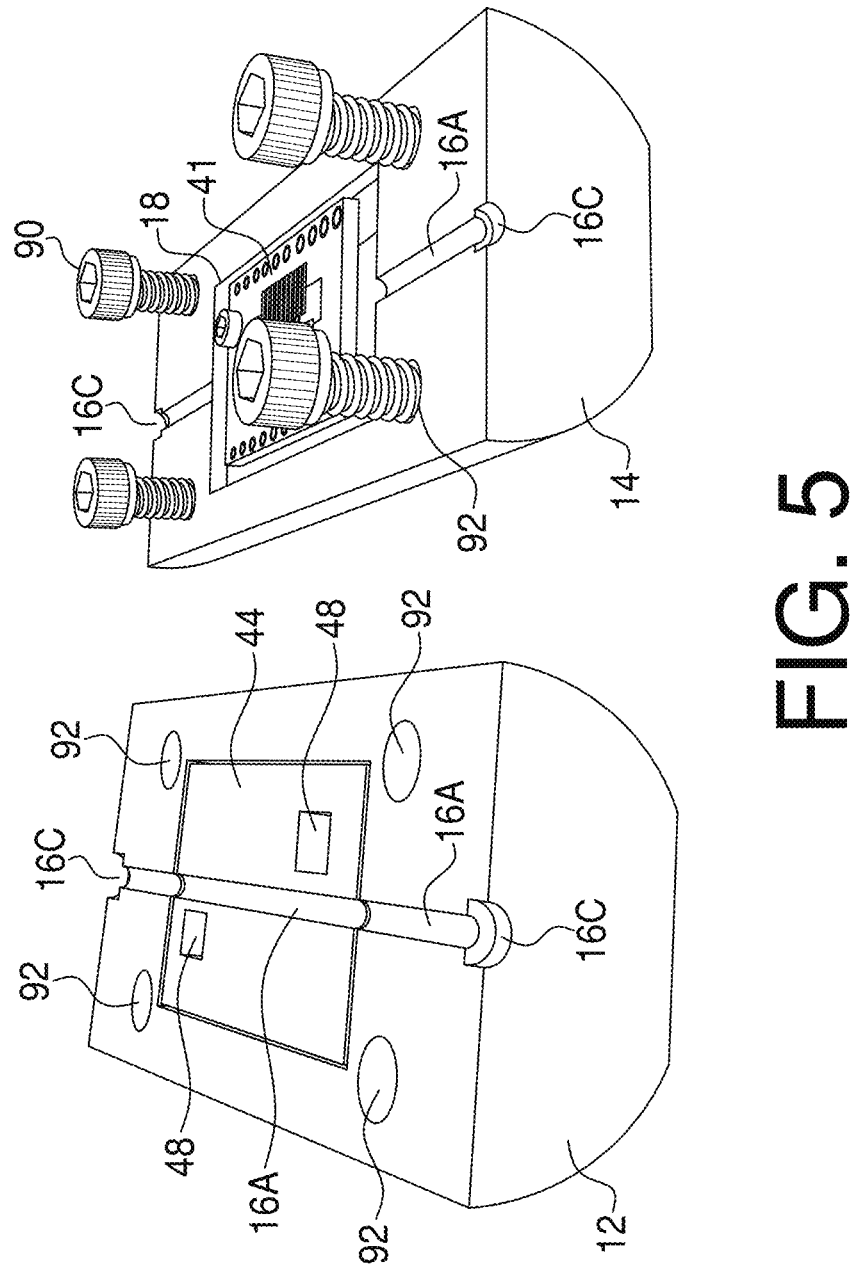
FIG. 5 is a perspective disassembled view of another embodiment of a fluid flow measuring apparatus made in accordance with principles of the disclosed subject matter.

FIGS. 5 and 6 are disassembled views of another embodiment of a sensor device 10 made in accordance with principles of the disclosed subject matter. The insulation element 44 and insulation element 40 can sandwich the circuit board 41 and mounting board 42 therebetween such that the sensors 30A-F and thermal source 20 are completely isolated from the non-insulative shells 12 and 14. Further, the circuit board 41 can be configured such that there is a space between the outer perimeter of the circuit board and the shell 14 such that the circuit board 41 itself is thermally isolated from the shells 12 and 14. The insulation element 44 can include a groove that forms a portion of the upper half 16A of through-hole 16. The remainder of the upper half 16A of through-hole 16 can be formed by two coaxial grooves on either side of the insulation element 44 formed in the shell 12. Opening bores 16C can be located at opposed distal ends of the through-hole 16 and have a diameter (when assembled) slightly greater than a diameter of a central portion of the through-hole 16 such that the conduit 71 can flex at its juncture at either end of the sensor device 10. If desired, a gasket or other structure can be mounted in the opening bores 16C to dampen the amount of flex for the conduit 71 relative to the sensor device 10. Openings 48 can be provided in the insulation element 44 to accommodate mounting structure, such as screws 91 for mounting the circuit board 41 to the mounting board or insulation element or mounting or wiring structures. Apertures 92 can be provided in the upper shell 12 for allowing screws 90 to extend therethrough and connect to threaded holes 93 in the lower shell 14 when assembled about conduit 71.

The circuit board 41 can be a printed circuit board and can be made from an insulative material, for example, fiberglass, or epoxies, which gives the board its rigidity.

An aspect of the disclosed subject matter is the dynamic range associated with the spacing of the sensors 30A-F (for example, the distances X, X', Y, Y', Z, and Z' noted above). A given spacing will give you a minimum or maximum flow measurement. One variable considered in the algorithm used to determine flow rate is heat bleed from the thermal source 20. The further apart the sensors 30A-F the higher the flow rate is measured. The closer together the sensors 30A-F the lower the flow rate can be measured. Flow rates of 0.050 mL per hour to 5 mL true per hour are exemplary flow rates to be measured. Further, the sensor device 10 can be configured to measure less than 0.05 mL per hour or more than 5 mL per hour, depending on application for the sensor device 10. The sensor device 10 can also be configured to measure less than 0.05 ml/hr Although six sensors 30A-F are depicted, more sensors can be used, and the more sensors, the more dynamic range is available for working with when inputting values into the algorithm used by controller 61. Thus, fewer sensors or more sensors (as compared to sensors 30A-F) can be used depending on cost, efficiency, and accuracy requirements for a particular application. The change in temperature and other parameters can be measured across the thermal source 20 and not necessarily between each sensor 30A-F. Measurements from the sensors 30A-F can occur 10 times per second for a minute which would provide 600 samples. The signals can then be parameterized and temperature can be plotted versus the flow rate. According to one aspect of the disclosed subject matter, a look up table can be used to correlate temperature data to flow rate. However there are many other methods that can be used. For example, spline interpretation of the values can be used to derive 15 functions. The values can be weighted by a reciprocal of the variance between the values. The thermal insulation between each of the sensors 30A-F can provide the symmetrical relationship that is helpful in measuring the low flow rate. Each of the sensors 30A-F can be considered to be thermally decoupled from each of its surrounding/other sensors 30A-F, and with respect to the thermal source 20. The sensors 30A-F and the thermal source 20 used in the presently disclosed subject matter do not contact the fluid that is to be measured. Instead, the sensors 30A-F and thermal source 20 contact the tubing or conduit 71 through which the fluid moves. Thus, there is always a tubing/conduit barrier between the sensor 30A-F and the fluid (and the thermal source 20 and the fluid).

Electrical communication/power lines 63 can connect the controller 61 to the sensor device 10. Electrical communication can be either one-way communication or two-way communication and can be networked or not networked. The controller 61 can also be referred to as an electronic control unit (ECU) or as a central processing unit. The sensor device 10 can be configured with hardware, with or without software, to perform the assigned task(s). The sensor device 10 can be configured as a smart sensor such that the sensor device 10 can process the raw data collected by the sensors 30A-F and thermal source 20 prior to transmission to the ECU 61, or the sensors 30A-F and thermal source 20 can be configured as simple sensors/thermal source(s) that pass the raw data directly to the ECU 61 without any manipulation of the raw data. The sensors 30A-F and thermal source 20 can be configured to send data to the ECU 61, with or without a prompt from the ECU 61.

The sensors 30A-F can be configured to measure the flow rate of fluids passing through flexible tubing. The sensor device 10 is optimized for sensing very low flow rates between approximately 0.05 ml/hour and 5 ml/hour, however, the performance range can be expanded. The sensors 30A-F and thermal source 20 do not make contact with the fluid during measurement and therefore provide a sterile environment for the fluid to be measured. Because the sensors 30A-F and thermal source 20 do not interfere (contact) with the flow of fluid being measured, calculation of flow rate does not require an adjustment to take into account the sensor's contact with the fluid. Conventionally, fluid sensors are typically of greater cost, and make contact with the fluid under measurement (so are non-sterile or single-use devices), or, do not allow flow measurements at very low flow speeds. The sensor device 10 does not make contact with the fluid under measurement, works at low flow speeds, and is reusable. Further, the sensor device 10 can detect direction of flow, flow rate, and the absence of flow.

The disclosed subject matter focuses on measurement technologies for low flow rates. There are many other flow sensor technologies for higher flow rates (i.e. turbines, electromagnetic, paddle wheels, Laser doppler etc.). These other low flow sensors and/or measurement techniques rely on: Gravimetric techniques—weighing the mass of fluid delivered over a set period of time; Optical interface tracking—optically measuring the displacement of a fluid meniscus in a volume over time; Optical drop measurement—optically measuring the growth of fluid drops emitted from tubing orifice; Optical PIV measurements—optically tracking the motion of particles trapped within the fluid; Manual displacement—measuring the bulk movement of fluid source system i.e. a syringe plunger; Optical interferometry—measuring fluid flow from estimates of optical interference patterns; Thermal Techniques—track variations in heat downstream of a heating element inserted into the fluid flow; Coriolis effect sensors—using displacement of a resonating glass tube as fluid traverses, as a mass flow measurement; Ultrasonic Acoustic sensors—the Doppler shift or transit time shift is measured between ultrasonic transducers in contact with the fluid flow. Many thermal techniques include the use of large invasive sensors inserted into pipes as well as micro-machined MEMS devices where the fluid is diverted through a silicon chip.

The sensor device 10 can be configured to measure complex thermal signatures generated at multiple points upstream and downstream of the small thermal element 20 that is in close contact with the sidewall of flexible tubing (conduit 71) carrying a flowing fluid. A mathematical algorithm is then used to translate the thermal signatures into an estimate of the fluid flow rate through the conduit 71. The algorithm relies on the symmetrical relationship between the sensors 30A-F about the thermal source 20 as well as the timing and intensity of the pulsed energy provided to the thermal source 20. The sensor device 10 itself can be a reusable, clamp-on device that can be attached to different types of conduit 71 (e.g., medical IV tubing) and is connected to electronics (analog to digital converters, power management etc.) that interface with the sensor signals for processing by computer.

The sensor device 10 as described above can include a split housing (upper shell 12 and lower shell 14) for clamping onto conduit 71 such as flexible tubing. The sensor device 10 can be clamped in place using screws or any exterior mechanism to hold the housing in tight contact with the tubing surface. The through-hole 16 through the sensor device 10 can be precision machined to align the tubing with the internal components (sensors 30A-F and thermal source 20) and provide an even and controlled pressure between the sensors 30A-F and thermal source 20 and the conduit 71 (too little pressure and the thermal signal is minimal, too much pressure and the tubing and flow can be constricted).

The electronics of the sensor device 10 can comprise or consist of a thermal source 20 configured as a heating element (a resistor), and a series of heat-sensing elements 30A-F (for example, thermistors) arranged upstream and downstream of the central heating element. These elements can be mounted on long electrically-conductive 'whiskers' 63A-N that can be in contact with mounting board 42 (which can be a PCB material) for connection to cables that carry the signals to the processing computer or controller 61. As shown in FIGS. 2A-D, the sensing elements and heater can be placed on a thermal insulator embedded within an outer heat-sink of the senor 10 housing. This configuration maximizes the system signal to noise ratio as well as helps ameliorate thermal fluctuations within the flowing fluid upstream of the sensor element region.

In operation, the thermal source 20 can be pulsed by an external electric current source and the thermal signals detected by the upstream and downstream sensors 30A-F can be measured for a period of time before the next thermal pulse in order to provide a continuous estimate of fluid flow (or lack of flow). The power for the thermal source 20 as well as the sensors 30A-F can be controlled by electronics external to the sensor (although the electronics could be miniaturized and incorporated into the senor 10.) The thermal signals (analog) are amplified and converted to digital signals by external electronics for computer analysis and conversion to a flow rate. The sensor device 10 can be used on multiple and different tubings as long as it can be calibrated on the new tubing type (each tubing type can have different thermal properties).

The ability of the array of sensors 30A-F to detect fluid flow through the tube is based on the principle of symmetry. The temperature sensors 30A-F are placed symmetrically upstream and downstream of the thermal source 20. When the thermal source 20 is a heat-flow element, it can be configured as a resistor, coil, Infrared (IR) laser or any other device capable of introducing heat, or heating and removing heat, such as a Peltier device. Using the thermal source 20, a thermal wave is introduced into the fluid within the tube by heating, cooling, or a time-varying combination of both. The "thermal wave" as just stated can consist of or include any perturbation to the temperature of the fluid within the conduit 71 caused by the action of the thermal source 20 whether the perturbation is an increase in temperature, a decrease in temperature or a combination of both over time. The thermal source 20 creates a thermal wave that propagates both upstream and downstream to the temperature sensors 30A-F. Any fluid flow through the tube introduces an asymmetric element into the heat distribution that is sensed by measuring temperature differences between pairs of these temperature sensors, i.e., (30A, 30F), (30B, 30E), and (30C, 30D). Although three pairs of sensors are shown in the drawings, the disclosed subject matter contemplates use of a single pairs of sensors, as well as 2, 4, 5, 6 pairs or more depending on application. The pairs can be symmetrical with respect to each other.

Thermal excitation (heating or cooling) of the thermal source 20 and detection of asymmetry induced by the flow can be done a number of ways including: 1. Impulsively heating and/or cooling the thermal source 20 and measuring the resulting time-dependent thermal pulse at the temperature sensors 30A-F. Patterns of impulsive thermal perturbation followed by observation are repeated, from which the time-varying liquid flow through the tubing can be recovered or calculated. 2. Heating/cooling the thermal source 20 with any suitable excitation waveform that encodes phase, such a sinusoid, and recovering the thermal asymmetry induced by flow through the conduit 71 by measuring phase differences in time-varying temperature observed at pairs of temperature sensors 30A-F. 3. Heating/cooling the thermal source 20 with a coded pulse such as a gold code or m-sequence or other codes with delta-function-like cross correlation properties, and detecting flow through the asymmetric temperature sensors' 30A-F response using temperature differences between pairs of temperature sensors 30A-F detected with filters matched to the code.

The controller 61 can include an algorithm that calculates fluid flow rates based on principles of symmetry. A flow of fluid through the conduit 71 will disturb the temperature response from sensors 30A-F when a known pulsed heat or cooling energy is applied to the fluid at a central position between sensors 30A-F that are symmetrically positioned about the pulsed thermal source 20. Sensors downstream observe a thermal wave symmetry that is disturbed by the flow of fluid in conduit 71. The sensors 30A-F, such as thermistors, can be carefully calibrated, for symmetry, and for no flow. Differences between upstream and downstream responses can be recorded. The pulses emitted by the thermal source 20 can be broken down into 15 channels; 45 parameters per flow. The use of: 1) symmetry; and 2) turning a pulse rate into a flow rate allows the sensor device 10 to measure the flow rate of fluid in the conduit accurately. In one embodiment, sine wave phase shift can be used with symmetry to calculate the flow rate.

Other variables that can be taken into account by the algorithm are: temperature of fluid entering system; viscosity of fluid being measured; head/tubing circumference.

The inlet to sensor device 10 can change the temperature of fluid coming into the sensor device 10, therefore temperature conditioning can occur before fluid reaches sensors 30A-F via contact with the housing 11 and heat sink of the upper shell 12 and lower shell 14. Balsa wood can be used as insulator material for insulation elements 40, 44. The length of through-hole 16 can be selected such that temperature of fluid is uniform in conduit 71 as it passes the sensors 30A-F (when thermal source is not being pulsed). If a different conduit or tube having different thermal qualities is used, software/calibration constants can be manipulated to account for the different conduit. Blocks can be used to keep sensor array 30A-F accurately positioned along conduit 71 and specifically in relation to the distance from the conduit in a direction perpendicular to the longitudinal axis L.A. of the conduit such that constant pressure can be exerted on the conduit 71 by the top surfaces 20T, and 30AT-30FT of the thermal source 20 and sensors 30A-F.

Hydrostatic pressure, and atmospheric pressure can change flow of fluid and can be accounted for in the algorithm used to calculate fluid low in conduit 71.

The thermal source 20 can heat the fluid via both conduction and radiation. For example, the source 20 can be an infrared thermal source.

The disclosed configuration allows the sensors 30A-F and thermal source 20 to be in tight thermal contact with the tubing while separated from each other via insulator materials. The sensors 30A-F and thermal source 20 are thus thermally isolated from each other to minimize cross talk. The long conductive connections (whiskers 63A-N) between the elements and the mounting board 42 or circuit board 41 also minimize thermal cross talk. The conduit 71 can be precisely aligned above the sensors 30A-F and thermal source 20 to ensure proper thermal isolation between these elements 30A-F and 20, and to ensure proper contact area and force, to minimize the effects of uncontrolled, random variables that may or may not be accounted for in the algorithm used in the disclosed subject matter.

The thermal pulse timing and intensity of the thermal source 20 can be precisely controlled by controller 61 (or internal controller) to optimize signal to noise ratio.

The sensors 30A-F and thermal source 20 can be thermally isolated from the housing of the sensor device 10 (e.g., shells 12, 14) via the insulation elements 40, 44 (and circuit board 41 and mounting board 42). The heat sink (e.g., the aluminum or other body that make up the shells 12, 14) can be configured to be large enough (so that it has sufficient thermal mass) to facilitate thermal isolation from the environment up to timescales of several minutes and can also be configured to make contact with the conduit 71 upstream of the sensors 30A-F and thermal source 20. The algorithm to calculate flow rates is complex and relies on critical symmetrical placement of the thermal sensors 30A-F on either side of the thermal element 20.

The conduit 71 can be in the form of a plastic tube (such as an IV tube, PICC line, etc.), ceramic tube, metal tube, glass tube, acrylic tube or other. The thickness and material composition of the conduit 71 can be consistent along its length to ensure unwanted variables are not introduced during operation of the fluid flow measuring apparatus. The type and size of conduit can be entered into either permanent or temporary memory for the controller 61 either during manufacture or during use by the operator. Similarly, the type of fluid being observed and its viscosity, heat conductivity, and other variables related to the fluid can be entered into either permanent or temporary memory for the controller 61 during manufacture or during use by the operator.

Figure 7:
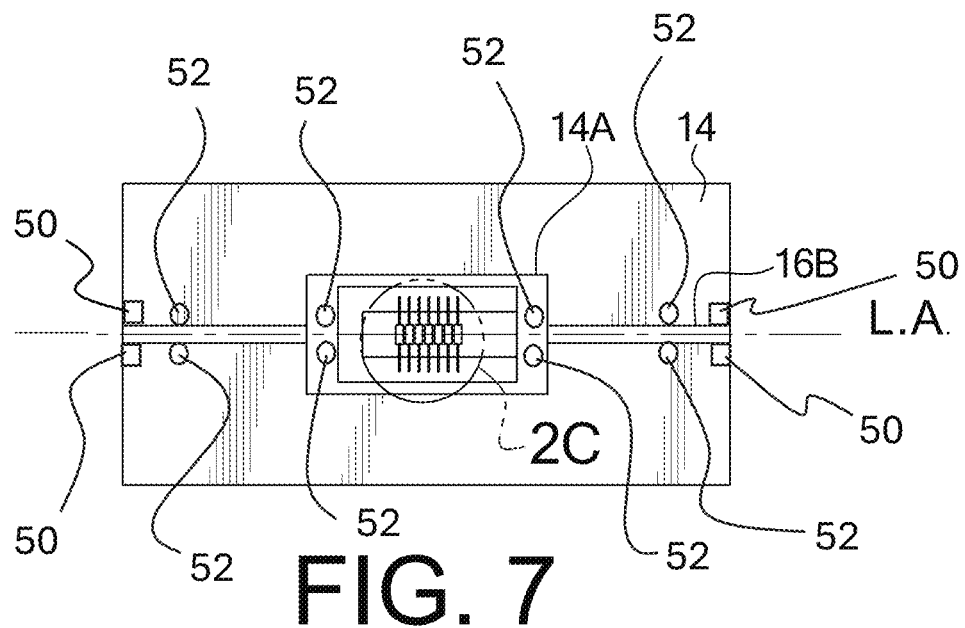
FIG. 7 is a top view of a lower shell of another embodiment of the fluid flow measuring apparatus made in accordance with principles of the disclosed subject matter.

FIG. 7 is a top view of a lower shell 14 of another embodiment of the sensor device 10 made in accordance with principles of the disclosed subject matter. In this embodiment, alignment structures 52, such as eight small bolts or posts, can be placed upstream and downstream of the sensors/thermal source 20 to guide and fix the conduit 71 into the through-hole 16B during both operation and during installation of the conduit 71. Four mount blocks 50, two at each end of the sensor device 10, can maintain the longitudinal axis of the conduit 71 aligned with the longitudinal axis LA of the senor 10.

Figure 8:
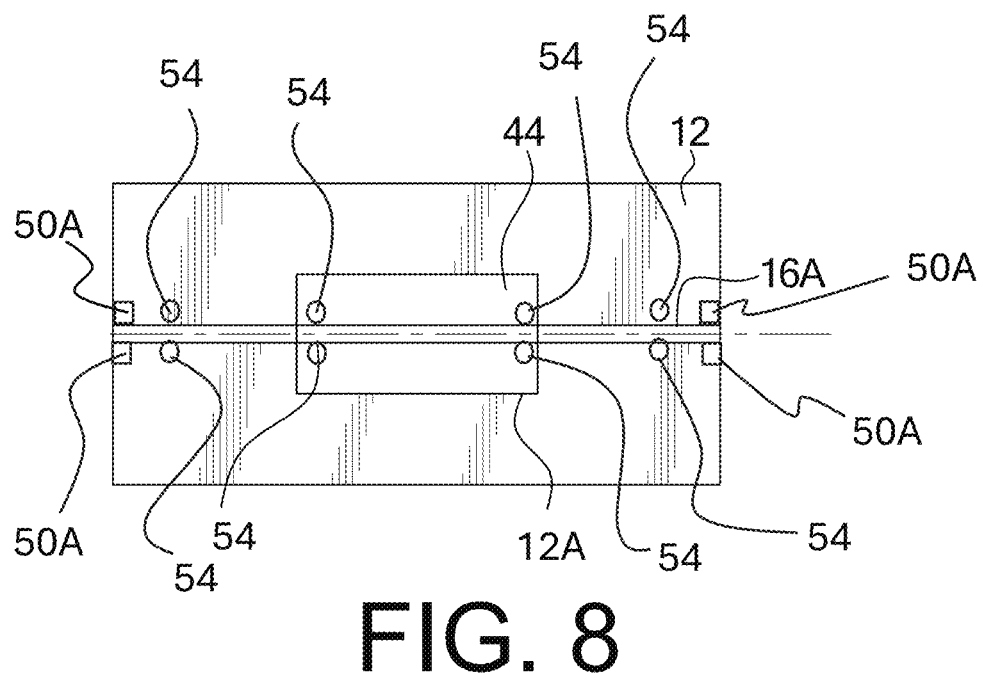
FIG. 8 is a bottom of an upper shell of the embodiment of the fluid flow measuring apparatus shown in FIG. 7.

FIG. 8 is a bottom view of an upper shell 12 of the embodiment of the sensor device 10 shown in FIG. 7. Recesses 54 can be provided in the upper shell 12 that correspond to and can receive the alignment structures 52 when the lower shell 14 is mated with the upper shell 12 to form sensor device 10. The alignment structures 52 and recesses 54 can be magnetized or include magnets to draw the upper shell 12 and lower shell 14 together and maintain firm connection therebetween. Alternatively, adhesives or additional connective structures can be provided to connect the upper shell 12 with the lower shell 14, as also noted in certain examples above. The alignment structures 52 can be configured as cylindrical posts or bolts, but can also be other shape and sized structures, including square or polygonal shaped structures, and can include a flat or beveled surface facing inward toward the conduit 71 to facilitate an exact location in 3-D coordinates of the conduit 71 with respect to the sensors 30A-F and thermal source 20. The number of alignment and location of alignment structures 52 can also vary depending on application and size of the sensor device 10.

Figure 9:
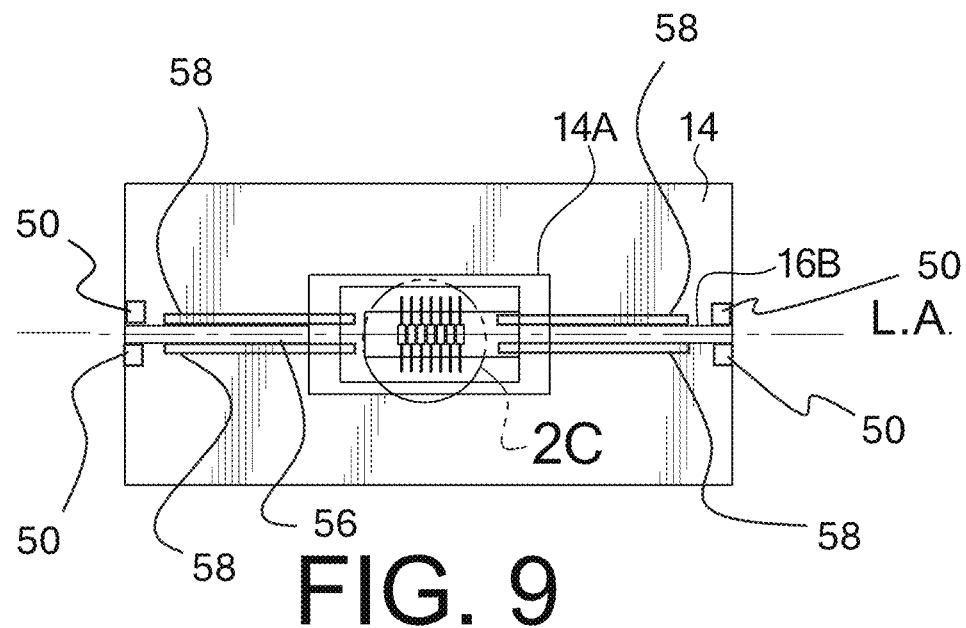
FIG. 9 is a top view of a lower shell of another embodiment of the fluid flow measuring apparatus made in accordance with principles of the disclosed subject matter.

FIG. 9 is a top view of a lower shell 14 of another embodiment of the sensor device 10 made in accordance with principles of the disclosed subject matter. In this embodiment a guide rail 58 can be located both above and below the lower half of through hole 16B. The guide rail can be a physical structure or can be an adhesive strip, either of which is configured to align the conduit 71 within the through-hole 16 and provide exact location of the conduit 71 with respect to the sensors 30A-F and thermal source 20 both during configuration of the sensor device 10 and during operation of the sensor device 10.

Figure 10:
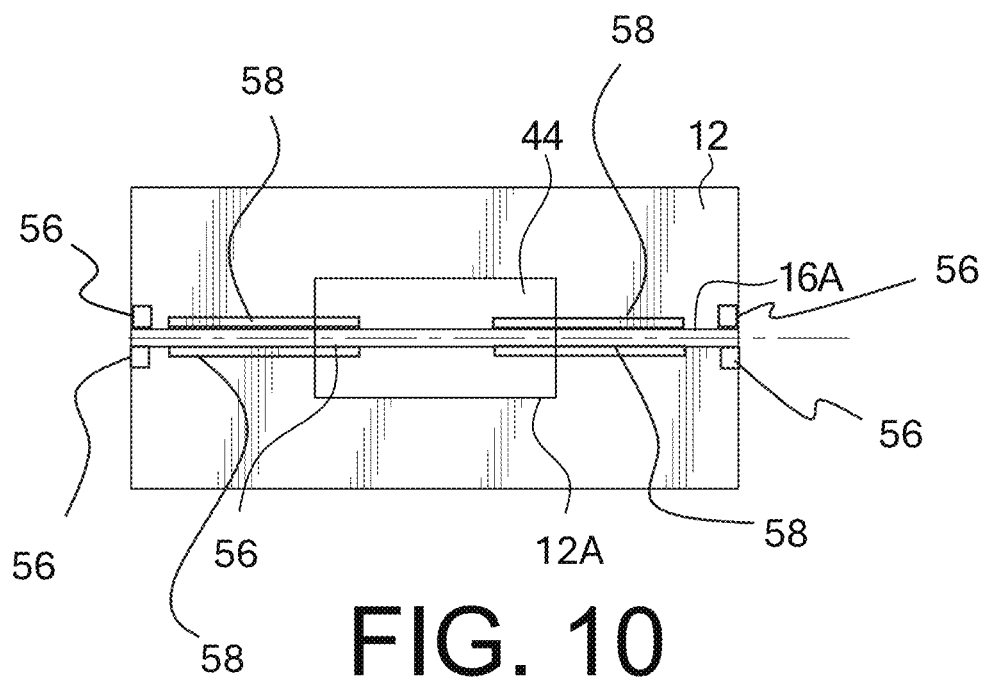
FIG. 10 is a bottom of an upper shell of the embodiment of the fluid flow measuring apparatus shown in FIG. 9.

FIG. 10 is a bottom view of an upper shell 12 of the embodiment of the sensor device 10 shown in FIG. 9. Similar to the lower shell 14, the upper shell 12 can include a guide rail 58. The rail 58 can be configured as a recess in the upper shell 12 that accommodates the external rail 58 of the lower shell 14. Of course, the recesses and rails or alignment structures 52 of any of the embodiments are interchangeable and can be placed on either of the upper shell 12 and lower shell 14 as desired in accordance with a particular application. An adhesive 56 in the form of a tape, film, or layer(s) can also be provided in one or both channels 16A, 16B that form the upper and lower half of the through hole 16 to keep the conduit 71 in an exact location and aligned in the through hole 16. The adhesive need not be a glue, but can be a material that encourages the conduit 71 to remain in place, including silicone surfaces, hook and loop surfaces, plastic weldings, etc.

Figure 11:
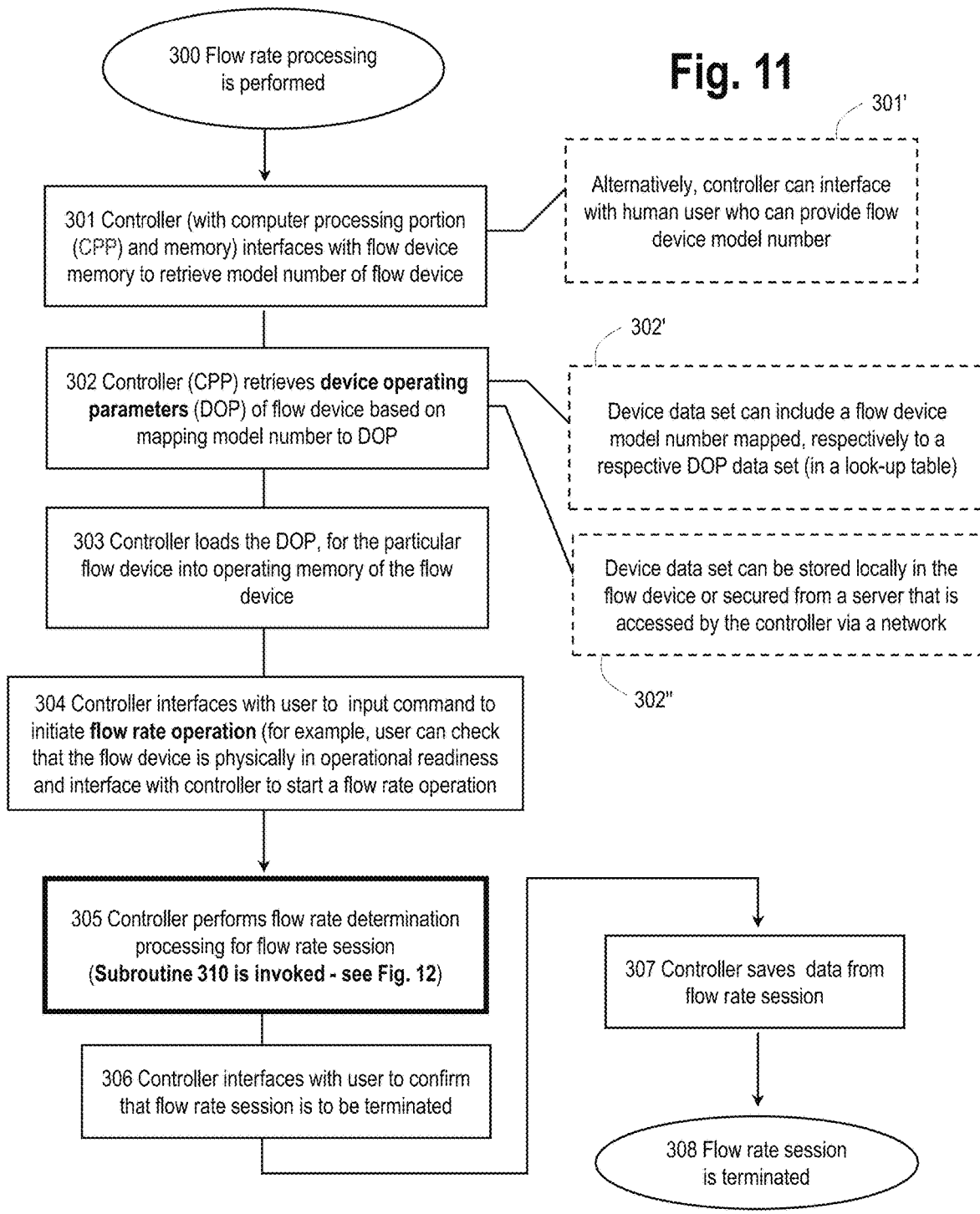
FIG. 11 is a high-level flowchart showing flow rate processing, in accordance with principles of the disclosure.

FIG. 11 is a high-level flowchart showing flow rate processing in accordance with at least one embodiment of the disclosure. The processing of FIG. 11 is initiated in step 300 and passes onto step 301. In step 301, a controller, as described below, interfaces with a flow device or flow sensor. More specifically a controller interfaces with a memory of a flow device so as to retrieve attributes of the flow device. For example, the attributes might be a model number or other identifying information of the flow device. Based on such data from the flow device, as described below, the controller, and more specifically a computer processing portion (CPP) of the controller, can determine what type of flow device is being utilized. As an alternative or in addition to step 31, the controller can interface with a human user who can provide a model number of the flow device and/or other identifying information, as reflected at 301'. The CPP can be associated with one or more memories or memory portions. After step 301, the process passes onto step 302.

In step 302, the controller retrieves device operating parameters (DOP) of the flow device based on, for example, mapping the model number to the DOP. For example, the controller might input the model number from the flow device and then access, via the Internet or other network, a third-party site. The model number can be provided to the third-party site, and the third-party site can map or associate the model number with the operating parameters of the flow device as well as to any other parameters that are needed by the controller to perform flow processing using the flow device. Alternatively, the operating parameters of the flow device and any parameters that are needed for the controller to perform flow processing (using the flow device) can be stored on the flow device itself. Accordingly, needed data for the controller to perform flow processing can be obtained from the flow device itself, from a third-party site, from some other informational source, and/or from any other source.

The DOP for a particular flow device can be provided in a "device data set", for example. As noted at 302', a device data set can include a flow device model number, i.e. a flow sensor model number, mapped to a respective DOP data set. For example, such mapping or association can be provided with a lookup table. As noted at 302", the device data set can be stored locally in the flow device and/or obtained from a server that is accessed by the controller by a network, for example. Also, the device data set could be stored in the controller itself. Accordingly, the controller could pull the model number from the flow device and then, using the model number, access the device data set in a memory in the controller itself. Accordingly, it is appreciated that various data for operation of the flow device can be distributed over the controller, the flow device, a server, and/or any other data source as may be desired.

After step 302, the process passes onto step 303. In step 303, in this embodiment, the controller loads the DOP, for the particular flow device, into the operating memory of the controller. Then, in step 304, the controller interfaces with user to input a command to initiate a flow rate operation, i.e. flow rate processing or flow rate determination processing. For example, a human user can check that the flow device is physically in an operational readiness state and that a tube, through which flow rate of liquid will be monitored, is physically positioned in the flow device. The human user can then interface with the controller to initiate flow rate determination processing. The process passes onto step 305.

In step 305, the controller performs flow rate determination processing for a flow rate session. That is, the controller and flow device can monitor flow rate of a liquid flow passing through the tube positioned in the flow device. To perform the processing of step 305, subroutine 310 can be called or invoked. Further details of subroutine 310 are described below with reference to FIG. 12.

Once the various processing of step 305 is performed through the course of a flow rate session, the process passes from step 305 onto step 306. In step 306, the controller interfaces with user to confirm that the flow rate session is to be terminated. If no in step 306, then the processing passes back to step 305. If yes in step 306, the process passes onto step 307.

In step 307, the controller saves the data from the flow rate session. Such saving of the data can include transferring or transmitting the data to be saved, archiving the data in some manner, packaging the data, and/or any other processing that securely saves the data and/or allows access to the data in the future, as may be desired.

After step 307, the process passed onto step 308. In step 308, the flow rate session is terminated.

Figure 12:
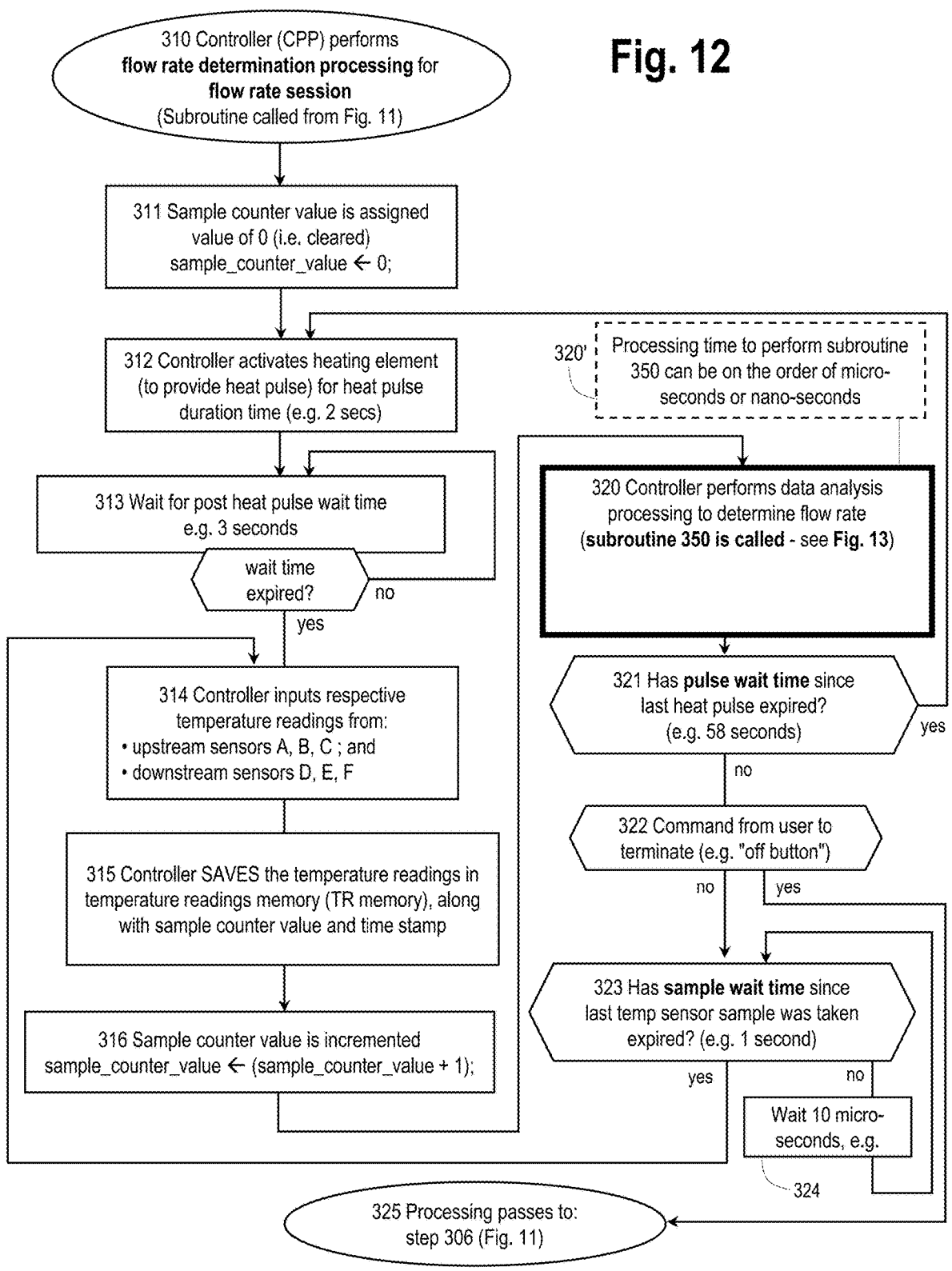
FIG. 12 is a flowchart showing details of a subroutine "controller performs flow rate determination processing for a flow rate session" as called from the processing of FIG. 11, in accordance with principles of the disclosure.

FIG. 12 is a flowchart showing details of subroutine 310 "CPP performs flow rate determination processing for a flow rate session" as called from the processing of step 305 of FIG. 11, in accordance with principles of the disclosure. The subroutine is initiated in step 310 and passes onto step 311. In step 311, a sample counter value is assigned a value of 0, i.e. the sample counter value is cleared or reset. The "sample counter value" can provide an incrementing value that can be associated with a "sample" of data, as such data is input from the flow device. in particular, the sample counter value can be used by the controller to keep track of what "sample" of temperature values is currently being processed. After step 311, the process passes onto step 312.

In step 312, the controller activates a heating element (or other thermal device) to provide a heat pulse for a heat pulse duration time. For example, the heat pulse duration time could be 2 seconds. That is, the heating element of the flow device can be turned on so as to emit heat for, for example, 2 seconds. The particular time in which thermal energy is emitted can be varied as desired. It is appreciated that in this example, a heating element is utilized for thermal energy. However, it is appreciated that any suitable source of thermal energy could be utilized in the practice of the systems, devices and/or apparatus of disclosure. For example, cooling energy or some other type of thermal energy could be utilized in the practice of the disclosure. Accordingly, while the processing described herein is in the context of a heating element, the disclosure is not limited to such heating element.

Also, various embodiments of the disclosure are described in the context of utilizing a "thermistor" for determination of temperature. A thermistor can be described as a resistance thermometer, i.e., a thermometer that includes a resistance element whose resistance is dependent on temperature. The controller can measure the resistance through the thermistor so as to determine temperature that the particular thermistor is exposed to. However, it is of course appreciated that any suitable temperature sensor can be utilized, as desired, and the disclosure is not limited to specifically use of a thermistor.

After step 312, the process passes onto step 313. In step 313, the controller waits for a post heat pulse wait time. That is, in some embodiments, the controller can impose a wait time in which the controller "waits" before inputting temperature readings from the various temperature sensors, such as thermistors. For example, the wait time can be 3 seconds. If the wait time has not expired, the process continues to loop through step 313. Once the wait time expires, processing passes onto step 314. In other embodiments, there is no wait time and the input of temperature data, i.e. the input of samples, is initiated immediately after the activation of the heating element.

Figure 23:
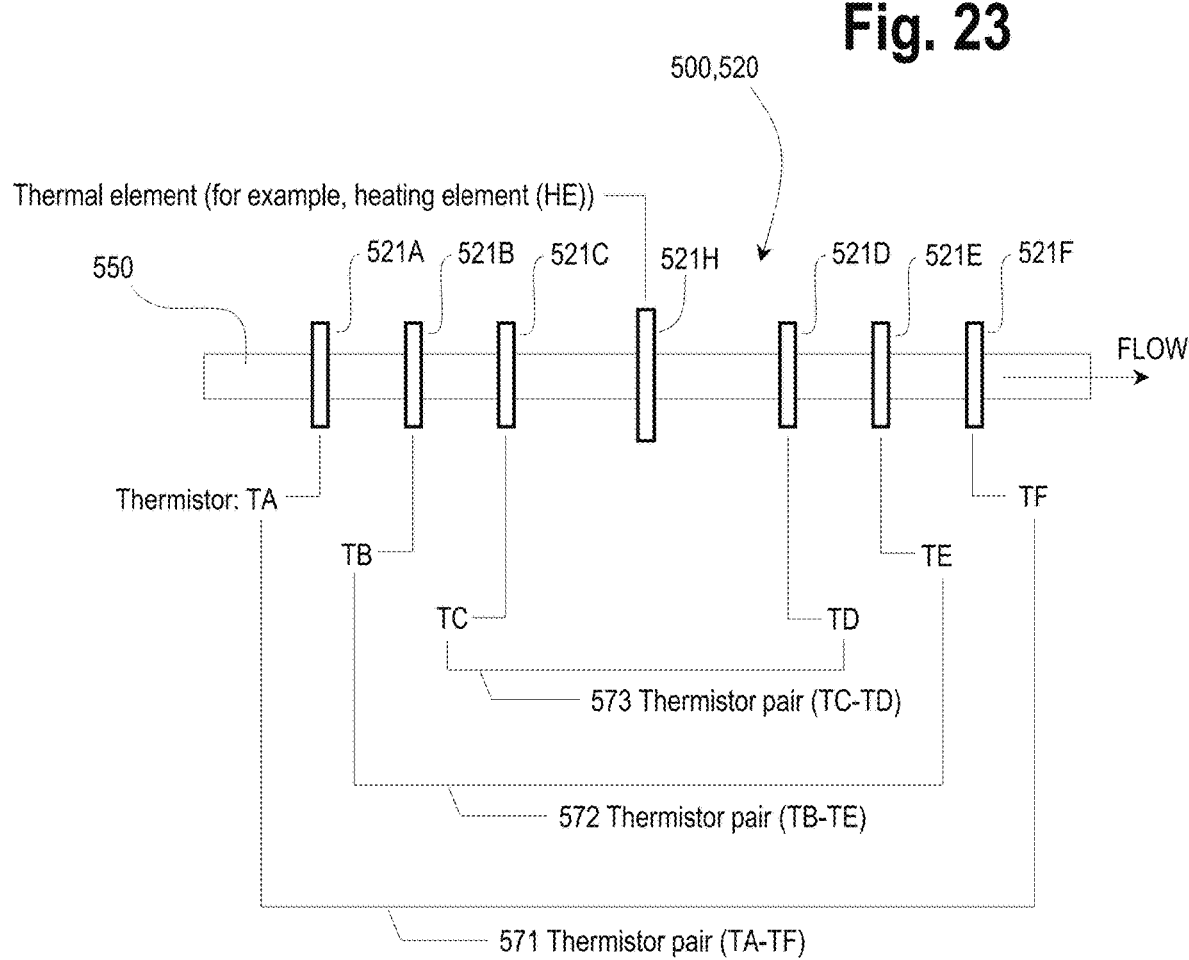
FIG. 23 is a schematic diagram of operating components of the component assembly of FIG. 22 and FIG. 22B, in accordance with principles of the disclosure.

In step 314, the controller inputs respective temperature readings from the upstream sensors A, B, C and the downstream sensors D, E, F (see illustrative FIG. 23). Such input data from the various sensors can be associated with the current sample counter value, as described above. Then, the process passes onto step 315. In step 315, the controller saves the data that was input. In particular, the controller can save the temperature readings in the temperature readings memory (TR memory). Such temperature data can be saved along with the sample counter value and a time stamp. Then, the process passes onto step 316

In step 316, the sample counter value is incremented:
sample_counter_value☐(sample_counter_value+1).

The sample counter value, now incremented to be a new value, will subsequently be associated with further input temperature readings from the temperature sensors, for another sample. After step 316, the process passes onto step 320. In step 320, the controller performs data analysis processing to determine flow rate. In particular, subroutine 350 is called or invoked, in accordance with at least one embodiment of the disclosed subject matter. Details of such processing are described below with reference to FIG. 13.

As described below, various processing is performed in subroutine 350 (or alternatively subroutine 700) so as to input additional temperature readings over time, i.e. processing to input further temperature samples from the various thermistors. Such temperature readings are then processed by the controller to generate a flow rate. Further details are described below with reference to FIG. 13.

After step 320, the process passes onto step 321. In step 321, the controller determines if a "pulse wait time", since the last heat pulse, has expired. In other words, the controller determines if a sufficient amount of time has passed so as to again activate the heating element so as to generate a further heat pulse. For example, the heating element might be generated every 58 seconds for 2 seconds. If a yes is rendered in step 321, the process passes back to step 312. Processing then continues as described above. On the other hand, if no in step 321, then the process passes onto step 322. In step 322, the controller determines if a command has been received from the user to terminate the flow determination processing. For example, has the user turned off the controller or in some other way interfaced with the controller so as to terminate flow rate determination processing. If yes, then the process passes onto step 325. In step 325, the processing passes back to step 306 of FIG. 11, and continues on as described above. If no in step 322, then the process passes onto step 323.

In step 323, the controller determines if the sample wait time since the last temperature sensor sample was taken expired. For example, the wait time might be 1 second, or may be much more often in the range of hundreds of thousandths of a second. If no in step 323, then the process passes onto step 324. In step 324, the controller waits 10 microseconds, for example, and then again checks if the sample wait time (since the last temperature sensor sample was taken) has expired.

Accordingly, if a yes is rendered in step 323, then the processing passes back to step 314. In step 314, the controller again inputs respective temperature readings from the various temperature sensors. Processing then continues as described above.

In this illustrative example, the sample wait time is 1 second. That is, in this example, temperature samples or readings are taken from the temperature sensors every 1 second. However, it is appreciated that the rate or periodicity that the temperature samples or readings are taken from the temperature sensors can vary depending on a variety of factors. For example, the rate at which temperature samples are taken can vary depending on the particular processing that is used to determine the flow rate from the temperature samples. Further, the rate at which temperature samples are taken can vary depending on the desired accuracy of the flow rate and/or on how often a flow rate determination is rendered and output to the user. In some embodiments, temperature samples or readings can be input from the temperature sensors thousands of times per second from each sensor. For example, temperature samples can be input from the temperature sensors 100 times per second or at any other periodicity as may be desired.

Further, the particular periodicity in which an updated flow rate is output from the controller can vary depending on particular processing that is utilized to generate the flow rate and/or the desired accuracy of the flow rate, for example. In some embodiments of the disclosure, the controller can generate an updated flow rate every time a further temperature sample is taken from the temperature sensors (or alternatively, every time a further predetermined number of temperature samples are taken from the temperature sensors). In other embodiments, the controller can generate an updated flow rate at some predetermined time interval, such as every 30 seconds, every 58 seconds, or every minute, for example. In some embodiments, in a cycle of the processing, the controller can generate an updated flow rate in sync with the pulsing of the heating element or other thermal energy element. For example, the heating element could be pulsed for 2 seconds, data collected over the next 58 seconds, and a flow rate generated and output after the 58 second data collection period. Thereafter, the heating element can again be pulsed so as to initiate a further cycle of the processing.

Figure 13:
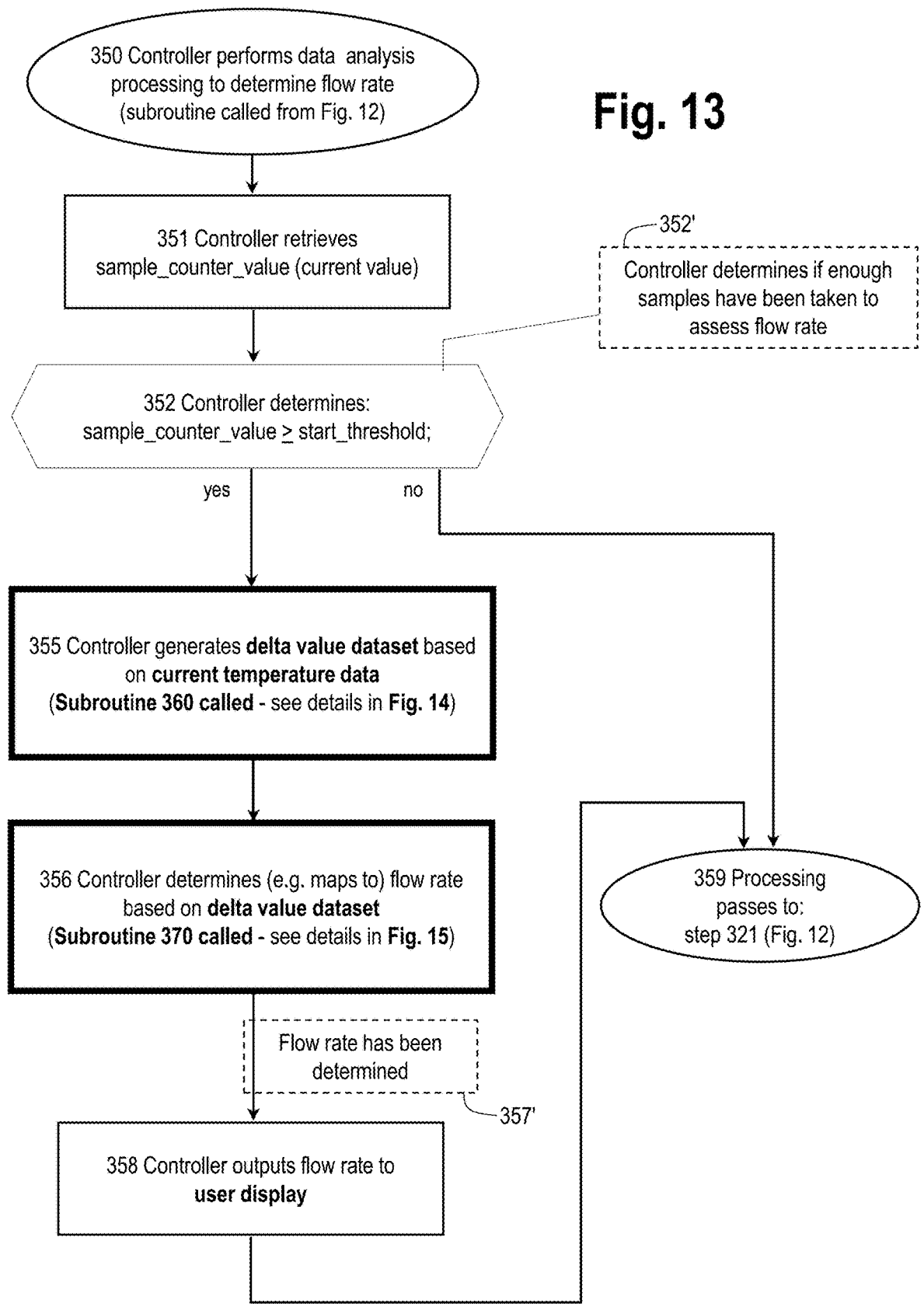
FIG. 13 is a flowchart showing details of subroutine "controller performs data analysis processing to determine flow rate" as called from the processing of FIG. 12, in accordance with principles of the disclosure.

FIG. 13 is a flowchart showing details of subroutine 350 "controller performs data analysis processing to determine flow rate" as called from the processing of step 320 of FIG. 12, in accordance with at least one embodiment of the disclosure. The subroutine is initiated in step 350 and passes onto step 351. In step 351, the controller retrieves the current value of the sample counter value, i.e. the current value of sample_counter_value. The sample counter value is indicative of how many samples have been taken and of the current sample being processed. In some embodiments of the disclosure, the controller can require a predetermined number of samples to be acquired prior to determining and outputting a determination of flow rate. Accordingly, in step 352, the controller determines if enough samples have been input, as reflected at 352'.

If no in step 352, the process passes onto step 359. In step 359, the processing passes to step 321 of FIG. 12. That is, the processing passes back to FIG. 12 for a further iteration of the processing of FIG. 12. In particular, such further iteration can include the input of a further set of temperature samples.

At a point in the processing, the determination of step 352 will render a yes. That is, a sufficient number of temperature samples have been taken so as to perform flow rate determination. Upon such yes determination, the processing passes onto step 355. In step 355, the controller generates a delta value data set based on the current temperature data. To perform such processing, subroutine 360 can be called or invoked. Such subroutine 360 is described below with reference to FIG. 14. In the processing of subroutine 360, differences, i.e. deltas, between temperature values observed in different temperature sensors can be determined. After step 355, the process passes onto step 356. In step 356, the controller determines a flow rate based on the delta value data set. Such determination of flow rate can also be based on prior input temperature data. The processing of step 356 can be performed by subroutine 370. Subroutine 370 is described below with reference to FIG. 15. Accordingly, upon the processing of step 356 being performed, i.e. subroutine 370 being performed, a flow rate has been determined as reflected at 357'. After step 356, the processing passes onto step 358. In step 358, the controller outputs the flow rate to a user display or in some other manner outputs the flow rate. Then, the process passes onto step 359. In step 359, processing is performed so as to perform an additional iteration of the flow rate determination.

Figure 14:
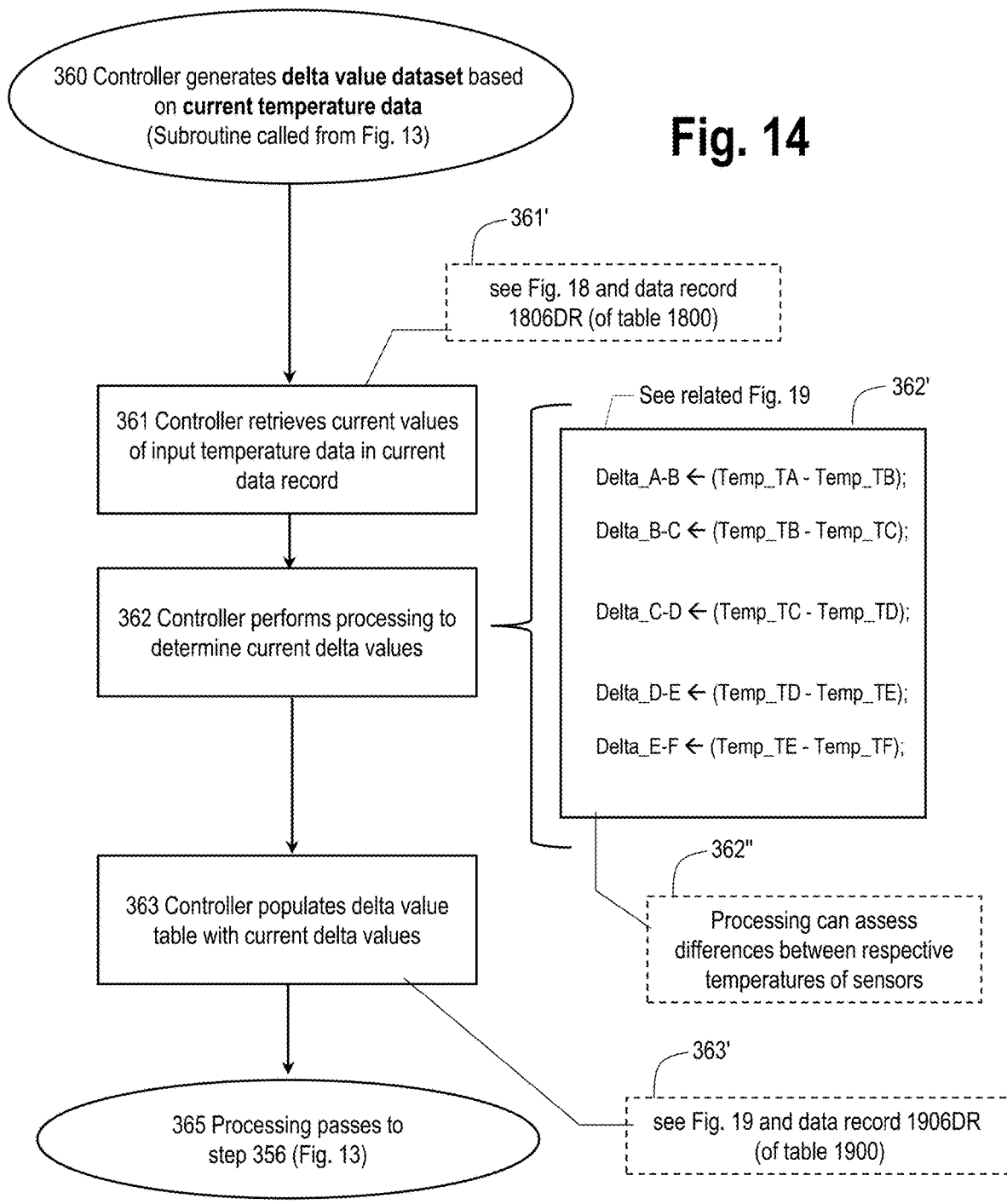
FIG. 14 is a flowchart showing details of subroutine "controller generates delta value dataset based on current temperature data" as called from the processing of FIG. 13, in accordance with principles of the disclosure.

FIG. 14 is a flowchart showing details of subroutine 360 "controller generates delta value dataset based on current temperature data" as called from the processing of FIG. 13, in accordance with at least one embodiment of the disclosure. FIG. 14 shows generation of delta temperatures for one embodiment of the disclosure. Subroutine 360 is initiated in step 360 and passes onto step 361. In step 361, the controller retrieves current values of input temperature data from the current data record containing such data. Illustratively, as noted at 361', FIG. 18 includes illustrative data. In particular, data record 1806DR (of table 1800) shows current temperature data that has been input by the controller. After step 361, the process passes onto step 362.

In step 362, the controller performs processing to determine current delta values. That is, as noted at 362", the controller can assess differences between respective temperatures input from thermistors or other temperature sensors. Such differences in temperature can then be utilized in the determination of flow rate. In the illustrative example of FIG. 14, the temperature differences that can be determined are illustrated at 362'. In this example, the physical flow device that can be utilized is the flow device or flow sensor 500 shown in FIG. 22, for example. In such physical device, thermistors A, B, C are upstream of the heating element 521H, with thermistor A being the furthest (i.e. the most outboard) from the heating element 521H. Thermistors D, E, F are downstream from heating element 521H, with thermistor F being the furthest (i.e. the most outboard) from the heating element 521H.

In the illustrative processing of FIG. 14, in step 362:
- The difference between the observed temperature of thermistor A in thermistor B can be determined—so as to generate a value: Delta_A-B.
- The difference between the observed temperature of thermistor B in thermistor C can be determined—so as to generate a value: Delta_B-C.
- The difference between the observed temperature of thermistor C in thermistor D can be determined—so as to generate a value: Delta_C-D.
- The difference between the observed temperature of thermistor D in thermistor E can be determined—so as to generate a value: Delta_D-E.
- The difference between the observed temperature of thermistor D in thermistor F can be determined—so as to generate a value: Delta_D-F.

Such processing scheme can compare temperature between adjacent pairs of thermistors (on one side of the heating element 521H), to generate temperature delta data. However, in other embodiments described below, the temperature of opposing pairs of thermistors can be compared, i.e. "opposing" meaning on opposing sides of the heating element 521H. That is, the temperature of opposing pairs of thermistors can be compared so as to generate delta temperature data. Such processing, using opposing pairs of thermistors, can leverage aspects of symmetry about the heating element 521H.

Various examples in this disclosure are presented in the context of a described flow sensor using a heating element, such as heating element 521H. As otherwise discussed herein, the disclosure is not limited to such heating element—in that other thermal element(s) can be used instead of a heating element. For example, in embodiment(s) described herein, as desired, a cooling element can be used in lieu of the described heating element. Relatedly, a Peltier module, i.e. a Peltier device, may be used as the thermal element to generate thermal energy. Accordingly, such Peltier module can be used as or in lieu of the heating element 521H. Such Peltier module can provide both warming and cooling effects by the controller passing electrical current therethrough.

With further reference to FIG. 14, Once the processing of step 362 is performed, the process advances to step 363. In step 363, the controller populates a delta value table with the current delta values, in this example (see FIG. 19 and data record 1906DR (of table 1900), as referenced at 362" of FIG. 14). After step 363 of FIG. 14, the process passes onto step 365. In step 365, the processing passes onto step 356 of FIG. 13.

Figure 15:
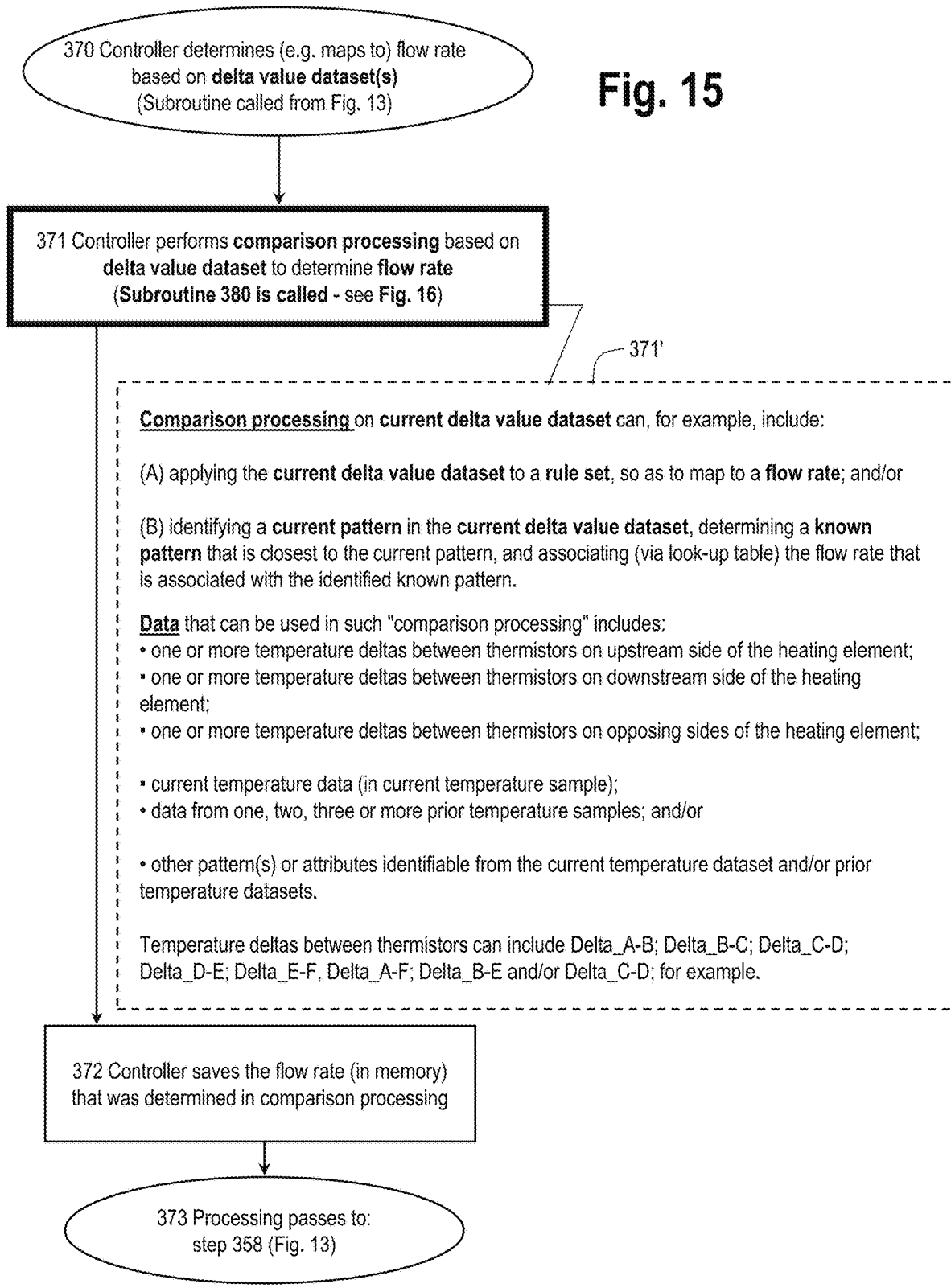
FIG. 15 is a flowchart showing details of subroutine "controller determines flow rate based on delta value dataset(s)" as called from the processing of FIG. 13, in accordance with principles of the disclosure.

FIG. 15 is a flowchart showing details of subroutine 360 "controller determines (e.g. maps to) flow rate based on delta value dataset(s)" as called from the processing of FIG. 13 (step 356), in accordance with at least one embodiment of the disclosure.

The processing of FIG. 15 is initiated in step 370 and passes onto step 371. In step 371, the controller performs comparison processing based on the delta value data set to determine flow rate. To perform such processing, a suitable subroutine can be called upon or invoked. Illustratively, in this example, subroutine 380 is called. Further details of subroutine 380 are described below and shown in FIG. 16.

As noted at 371' in FIG. 15, various processing can be performed so as to determine a flow rate based on a delta value data set obtained from the various thermistors of the flow device 500. Comparison processing on a current delta value dataset can include, for example, (A) applying the current delta value dataset to a rule set, so as to map to a flow rate; and/or (B) identifying a current pattern in the current delta value dataset, determining a known pattern that is closest to the current pattern, and associating (via look-up table) the flow rate that is associated with the identified known pattern.

Data that can be used in such "comparison processing" can include: one or more temperature deltas on upstream side of the heating element; one or more temperature deltas on downstream side of the heating element; current temperature data (in current temperature sample); data from one, two, three or more prior temperature samples or over a particular period of time; and/or other pattern(s) or attributes identifiable from the current temperature dataset and/or prior temperature datasets. Any temperature differences, i.e. deltas, between the various temperature sensors of the particular flow device utilized, can be used dependent on the physical attributes of the flow sensor utilized and/or dependent on the particular processing performed by the controller (to determine flow rate based on input temperature data). For example, temperature deltas can include Delta_A-B; Delta_B-C; Delta_C-D; Delta_D-E; and/or Delta_E-F; Delta_A-F; Delta_B-E and/or Delta_C-D; for example. Further details and additional examples of different processing methodologies are described below.

Accordingly, in step 371, a flow rate of fluid passing through tube 590 in flow sensor 500 (see FIG. 22) is determined in this example. After step 371, the process passes onto step 372. In step 372, the controller saves the flow rate that was determined in the comparison processing (step 371) in a suitable data store or memory. Then, the process passes onto step 373. In step 373, the processing passes to step 358 of FIG. 13.

Figure 22:
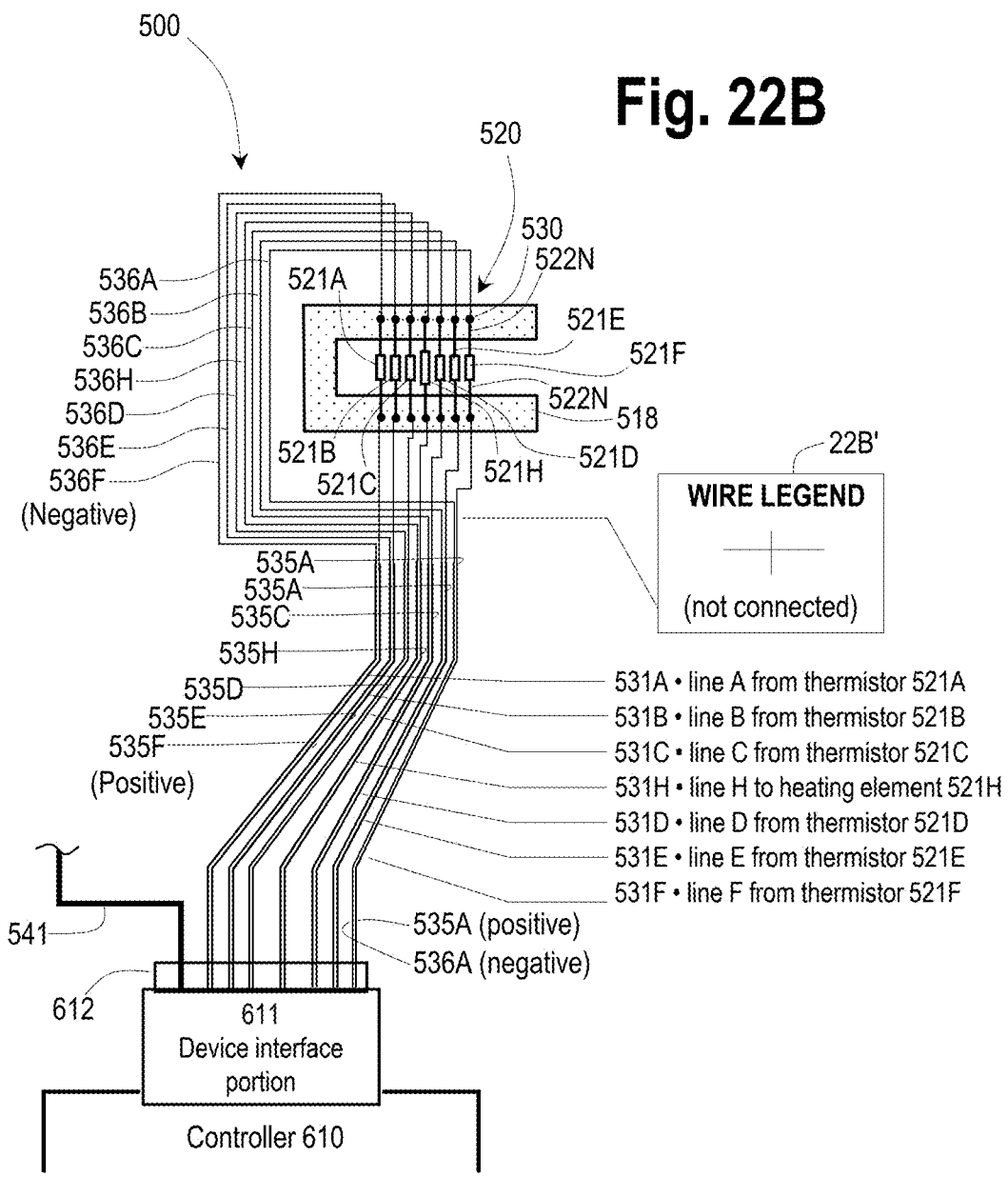
FIG. 22 is a schematic diagram showing a flow sensor system, in accordance with principles of the disclosure.

As described above, in step 358, the controller outputs the observed flow rate to a user display or in some other manner outputs the observed flow rate. For example, the flow rate might be displayed on a user interface portion 613 of a controller 610, as shown in FIG. 22. The flow rate might be output to the user via some communication channel, such as via a text message to the user. Processing then continues on as described above.

Various illustrative processing methodologies are described herein. Relatedly, FIGS. 16, 17 and 20 relate to different processing to determine flow rate based on temperature data.

Figure 16:
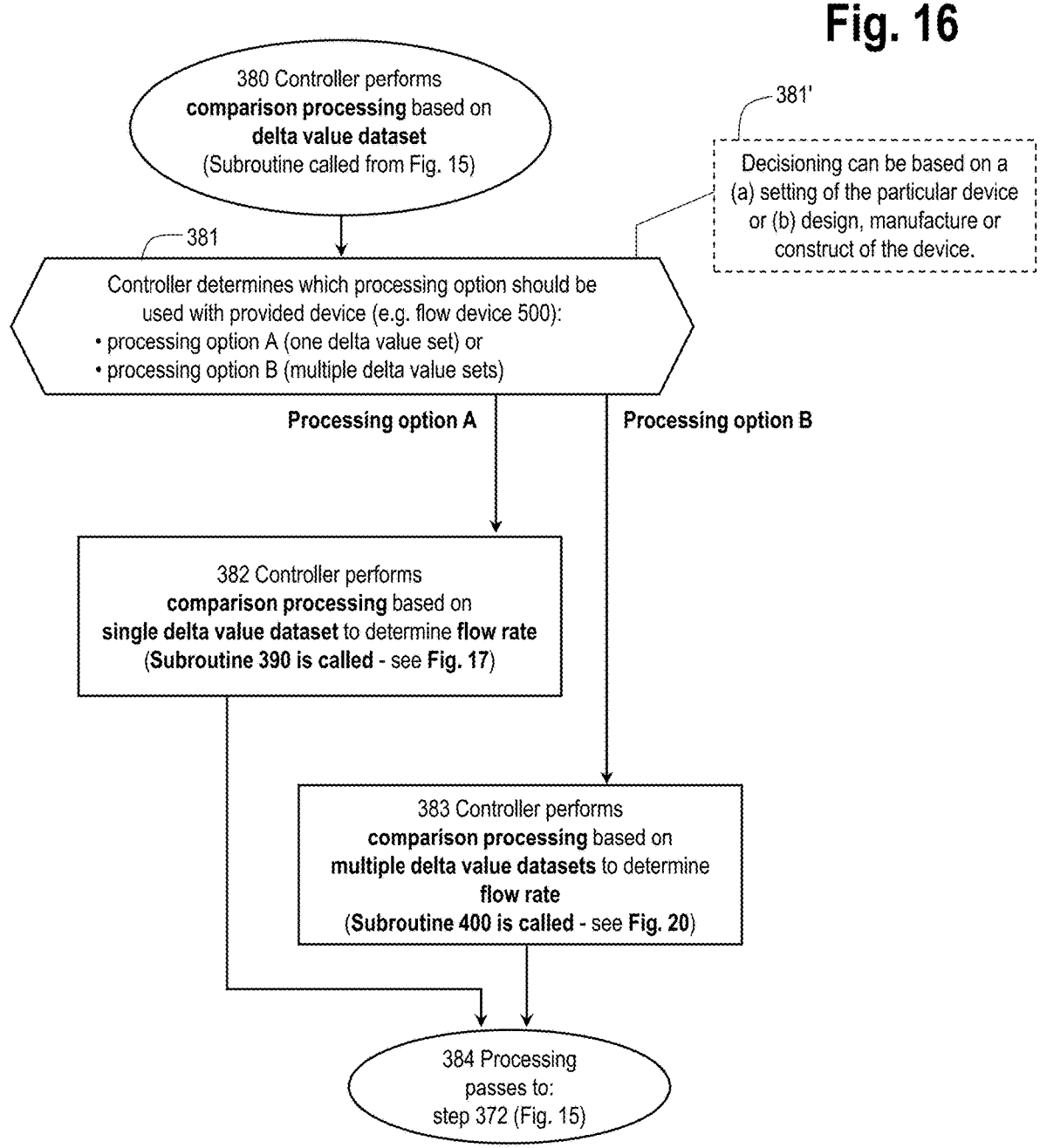
FIG. 16 is a flowchart showing details of subroutine "controller performs comparison processing based on delta value dataset" as called from the processing of FIG. 15, in accordance with principles of the disclosure.

FIG. 16 is a flowchart showing details of subroutine 380 "controller performs comparison processing based on delta value dataset" as called from the processing of FIG. 15 (step 371), in accordance with at least one embodiment of the disclosure. The subroutine of FIG. 16 is initiated in step 380 and passes onto step 381. In step 381, the controller determines which processing option should be used with the provided device, i.e. with the provided physical device. That is, it is appreciated that a particular controller can be set up, programed, and/or coded to perform different processing techniques based on the particular physical device that the controller is connected to. For example, some flow sensors may have thermistors close or in physical proximity to each other as compared to other flow sensors. Relatedly, some flow sensors may be physically adapted to more rapid flows, whereas other flow sensors are physically adapted to very slow flows. The particular processing technique or methodology that is used by the controller can vary depending on which flow sensor is used. Further, even with the same flow sensor and the same controller, the user can be provided with a setting that dictates which particular methodology or technique is used to determine flow rate based on temperature data. That is, even with the same flow sensor, the controller can vary the particular processing that is utilized depending on the particular flow rate that is expected.

In addition, the controller might be provided with the ability to dynamically switch between different processing methodologies so as to utilize a processing methodology that is particularly suited to the flow rate being observed. Such an ability may include processing methodologies particularly suited to detecting a condition of no-flow through the conduit.

For example, a first processing methodology might be used to determined flow rates if a flow rate is observed below a particular threshold (in an operational range), and a second processing methodology might be used to determined flow rates if a flow rate is observed above the particular threshold (in the operational range). That is, either of the first processing methodology or the second processing methodology may be able to determine flow rate over the entire operational range, but may not be as accurate over some flow rates in such operational range. Thus, in this example, if the first processing methodology detects a flow rate above the threshold, the controller can then switch so as to use the second processing methodology, i.e. switch to use the more accurate processing methodology for the currently observed flow rate. For instance, for different processing methodologies, timing may be adjusted (by the controller) and vary for different flow speeds; and/or weighting the deltas may be adjusted, such as at higher flow rates weighting the deltas heavier for the farthest distant thermistor pairs, i.e. farthest distant from the heating element or other thermal element. Other parameters, as described herein, may be adjusted (by the controller) based on the particular flow rate observed by the controller.

Relatedly, with further reference to step 381 of FIG. 16, the controller, in this example, performs a determination of which of two processing options are to be utilized to determine flow rate. The controller can perform such decisioning based on attributes of the flow sensor that is connected to the controller. The controller can perform such decisioning based on detection of a setting that can be set, for example toggled, by a human user. Such decisioning of which processing to use can be based on other data, attributes, or input as desired.

In the example of FIG. 16, processing option A performs flow rate determination processing based on one delta value set. On the other hand, a processing option B performs flow rate determination processing based on multiple delta value sets. That is, in processing option B, the controller uses the deltas in temperature observed, respectively, between multiple pairs of thermistors. Accordingly, if processing option A is selected, the process passes onto step 382. On the other hand, if processing option B is selected, the process passes onto step 383.

In step 382, the controller performs comparison processing based on a single delta value dataset to determine flow rate. To perform such processing, subroutine 390 can be called. Such processing is described below with reference to FIG. 17.

In step 383, the controller performs comparison processing based on a multiple delta value dataset to determine flow rate. That is, data is used that includes delta data between at least 2, respective, pairs of sensors. To perform such processing, subroutine 400 can be called. Such processing is described below with reference to FIG. 20.

After either of step 382 or step 383, the process passes onto step 384. In step 384, the processing passes to step 372 of FIG. 15. As described above, in step 372, the flow rate data is saved in a suitable memory. Processing then continues as described above.

Figure 17:
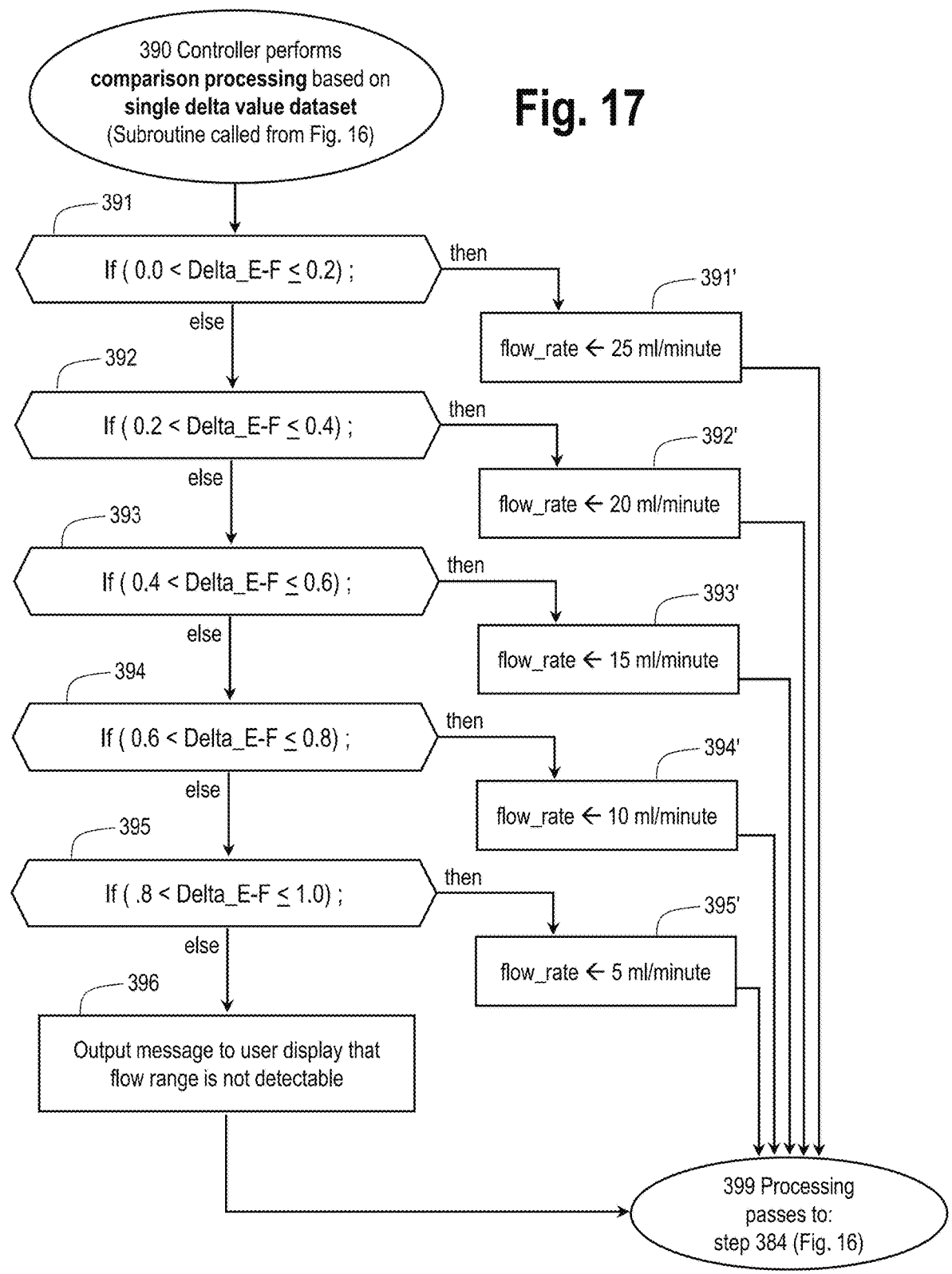
FIG. 17 is a flowchart showing details of subroutine "controller performs comparison processing based on single delta value dataset" as called from the processing of FIG. 16, in accordance with principles of the disclosure.

FIG. 17 is a flowchart showing details of subroutine 380 "controller performs comparison processing based on single delta value dataset" as called from the processing of FIG. 16 (step 382), in accordance with at least one embodiment of the disclosure. In the illustrative processing of FIG. 17, the temperature difference between thermistor E and thermistor F (from the processing of FIG. 14) can be used to determine flow rate, i.e. one delta value can be used to determine flow rate. Such processing scheme may not utilize symmetry about the thermal element, which might by a heating element, for example. Further embodiments of the disclosure described below do utilize symmetry of thermistor placement about the thermal element.

Accordingly, in accordance with some embodiments of the disclosure, a processing scheme can be used that might be described as a single-delta algorithm. With such single-delta algorithm, deltas may be taken at a known and prescribed time after the initiation of a thermal pulse. The reason for this is that the temperature deltas between thermistors are a function of time. Such temperature deltas are initially low, then they increase, and then they decrease as time progresses after pulse initiation. In order to determine flow rate from a mapping of delta values to flow rate may require that the deltas be measured at a time when they correspond to the predetermined mapping to flow rate. In one embodiment of the processing scheme, this time can be the time during which the deltas take on their maximum values, in accordance with at least one embodiment of the disclosure.

The processing of FIG. 17 is initiated in step 390 and passes onto step 391.

In step 391, the controller determines if the expression (0.0<Delta_E-F<0.2) is satisfied. If such expression is satisfied, then the controller determines that the flow rate that is being observed is 25 ml/minute, in step 391'. Otherwise, i.e. "else", the processing passes onto step 392.

In step 392, the controller determines if the expression (0.2<Delta_E-F<0.4) is satisfied. If such expression is satisfied, then the controller determines that the flow rate that is being observed is 20 ml/minute, in step 392'. Otherwise, i.e. "else", the processing passes onto step 393.

In step 393, the controller determines if the expression (0.4<Delta_E-F<0.6) is satisfied. If such expression is satisfied, then the controller determines that the flow rate that is being observed is 15 ml/minute, in step 393'. Otherwise, i.e. "else", the processing passes onto step 394.

In step 394, the controller determines if the expression (0.6<Delta_E-F<0.8) is satisfied. If such expression is satisfied, then the controller determines that the flow rate that is being observed is 10 ml/minute, in step 394'. Otherwise, i.e. "else", the processing passes onto step 395.

In step 395, the controller determines if the expression (0.8<Delta_E-F<1.0) is satisfied. If such expression is satisfied, then the controller determines that the flow rate that is being observed is 5 ml/minute, in step 395'.

Otherwise, i.e. "else", the processing passes onto step 396. In step 396, the controller outputs a message to the user display that the flow range is not detectable. For example, the reason that the flow range may not be detectable is that the flow range is out of the operating range of the particular flow sensor being used and/or out of the operating range of the processing being utilized by the controller.

As shown in FIG. 17, after any of steps 391', 392', 393', 394', 395', and 396, the process passes onto step 399. In step 399, the process passes onto step 384 of FIG. 16. Processing then continues on as described above.

FIG. 18 is a schematic diagram showing a sample data table 1800. Table 1800 shows temperature data that has been input from the various thermistors of a flow sensor. For example, the flow sensor could be the flow sensor 500 shown in FIG. 22.

As shown in FIG. 18, table 1800 includes a plurality of data records. Data record 1800DR' includes data content of the name of the table. Such data can allow the controller to locate and access the table 1800.

Data record 1800DR includes the name of fields of the table 1800. A first field is the sample number for the particular data record. For example, such sample number could constitute the sample counter value of the processing of step 311 (FIG. 12) and related processing. A second field could be a time number or time value. Such time value can specify that the particular sample was taken 0 seconds from when sampling was initiated, 2 seconds from when sampling was initiated, 4 seconds from when sampling was initiated, and so forth.

It is appreciated that the periodicity of FIG. 18 may be simplified as to what is actually used in practice of the disclosure. That is, in practice of the disclosure, samples may be taken in hundreds of a second or thousands of the second, for example. The periodicity in which samples are taken may be varied as desired, as otherwise described herein.

As shown in table 1800 of FIG. 18, fields are provided for temperature values that were input from each respective thermistor. Accordingly, for example, the temperature that was input for sample 1, for thermistor A, was 25.8075 degrees Celsius. For the same sample, the temperature that was input for thermistor B was 25.7320. Table 1800 includes the various other temperature data.

In the example of FIG. 18, six (6) samples have been input by the controller. Data representing such samples are shown in data records 1801DR; 1802DR, 1803DR, 1804DR, 1805DR, 1806DR. Data for data record 1807DR has not yet been input, as reflected at 1801'. As noted at 1802', the data record 1806DR illustrates the temperature data observed in the current sample, in this illustrative processing. That is, as the data for record for 1807DR has not yet been inputted, in the example of FIG. 18, seven (7) data records are shown, six (6) of which have data inputted.

FIG. 19 is a schematic diagram showing a delta temperature data table 1900. Table 1900 shows illustrative delta temperature data that has been determined, by the controller, by determining the difference or delta between a temperature of different thermistors.

As shown in FIG. 19, table 1900 includes a plurality of data records. Data record 1900DR' includes data content of the name of the table. Such data can allow the controller to locate and access the table 1900.

Data record 1900DR includes the name of fields of the table 1900. A first field is the sample number for the particular data record. in the example of FIG. 19, data records 1901DR; 1902DR, 1903DR, 1904DR, 1905DR, 1906DR and 1907DR are provided for each respective sample that was input over time.

That is, as shown in FIG. 19, each sample number is associated with a data record. In each of such data records, fields can be provided for delta temperature data between the various thermistors. As noted at 1901, the data of table 1900 is derived from the data of table 1800, of FIG. 18. For example, for sample 1, table 1900 is populated with a value for Delta_A-B. Such a value is 0.0755. Such value is derived from the difference between the temperature reading of thermistor A and the temperature reading of thermistor B in sample 1, as shown in FIG. 18. That is, 25.8075−25.7320=0.0755. Such delta value, along with many other delta values, are used in the processing of the disclosure as described herein.

Figure 20:
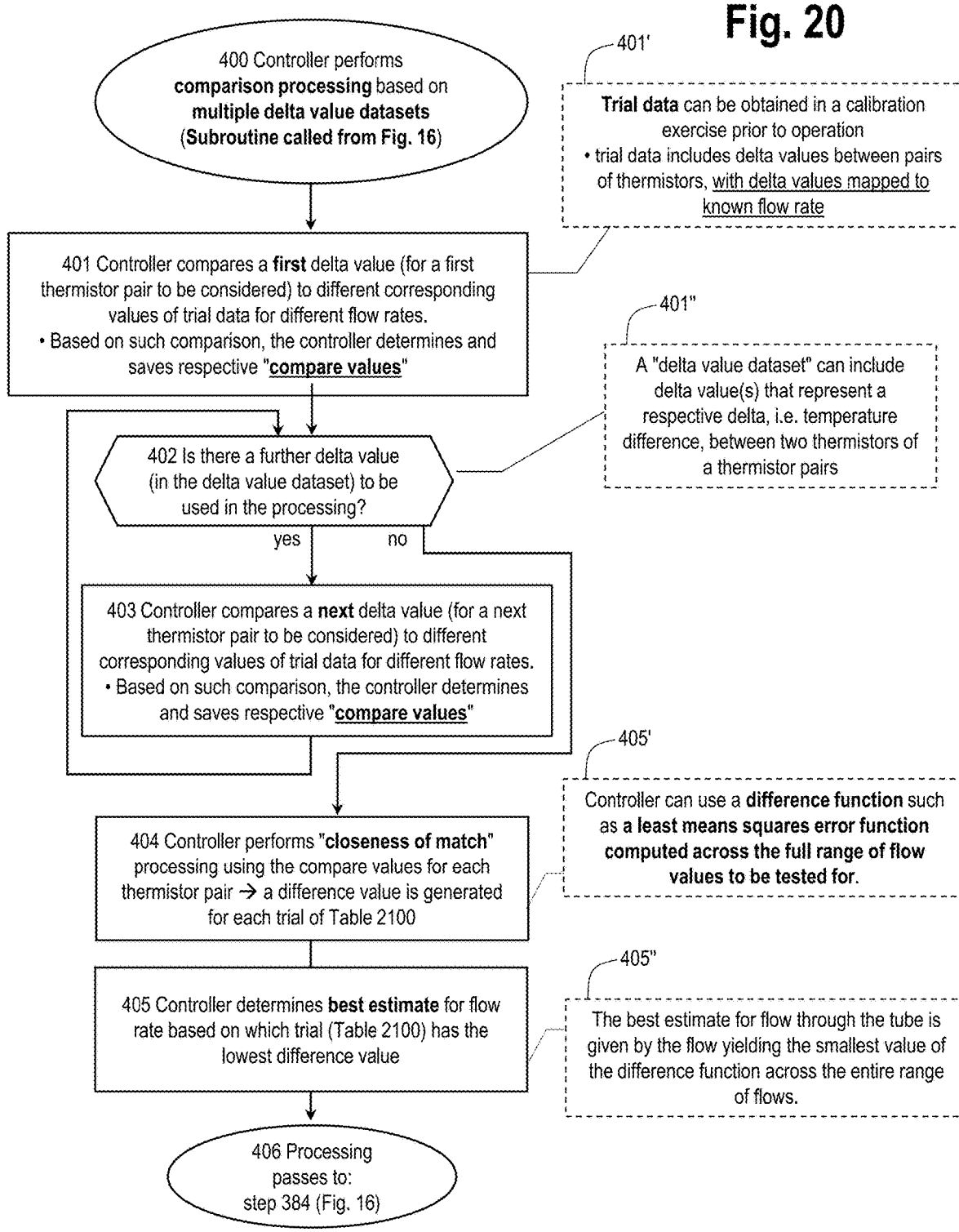
FIG. 20 is a flowchart showing details of subroutine "controller performs comparison processing based on multiple delta value datasets" as called from the processing of FIG. 20, in accordance with principles of the disclosure.

FIG. 20 is a flowchart showing details of subroutine 40 "controller performs comparison processing based on multiple delta value datasets" as called from the processing of FIG. 20 (step 383), in accordance with at least one embodiment of the disclosure. In the illustrative processing of FIG. 20, the temperature difference between multiple pairs of thermistors can be used to determine flow rate. The processing of FIG. 20 starts in step 400 and passes onto step 401.

In step 401, the controller compares a first delta value (for a first thermistor pair to be considered) to different corresponding values of trial data for different flow rates. Based on such comparison, the controller determines respective "difference values". Relatedly, the "trial data" includes delta values between pairs of thermistors, with delta values mapped to known flow rate. As noted at 401', trial data can be obtained in a calibration exercise of the flow sensor prior to operation of the flow sensor "in the field".

Figure 21:
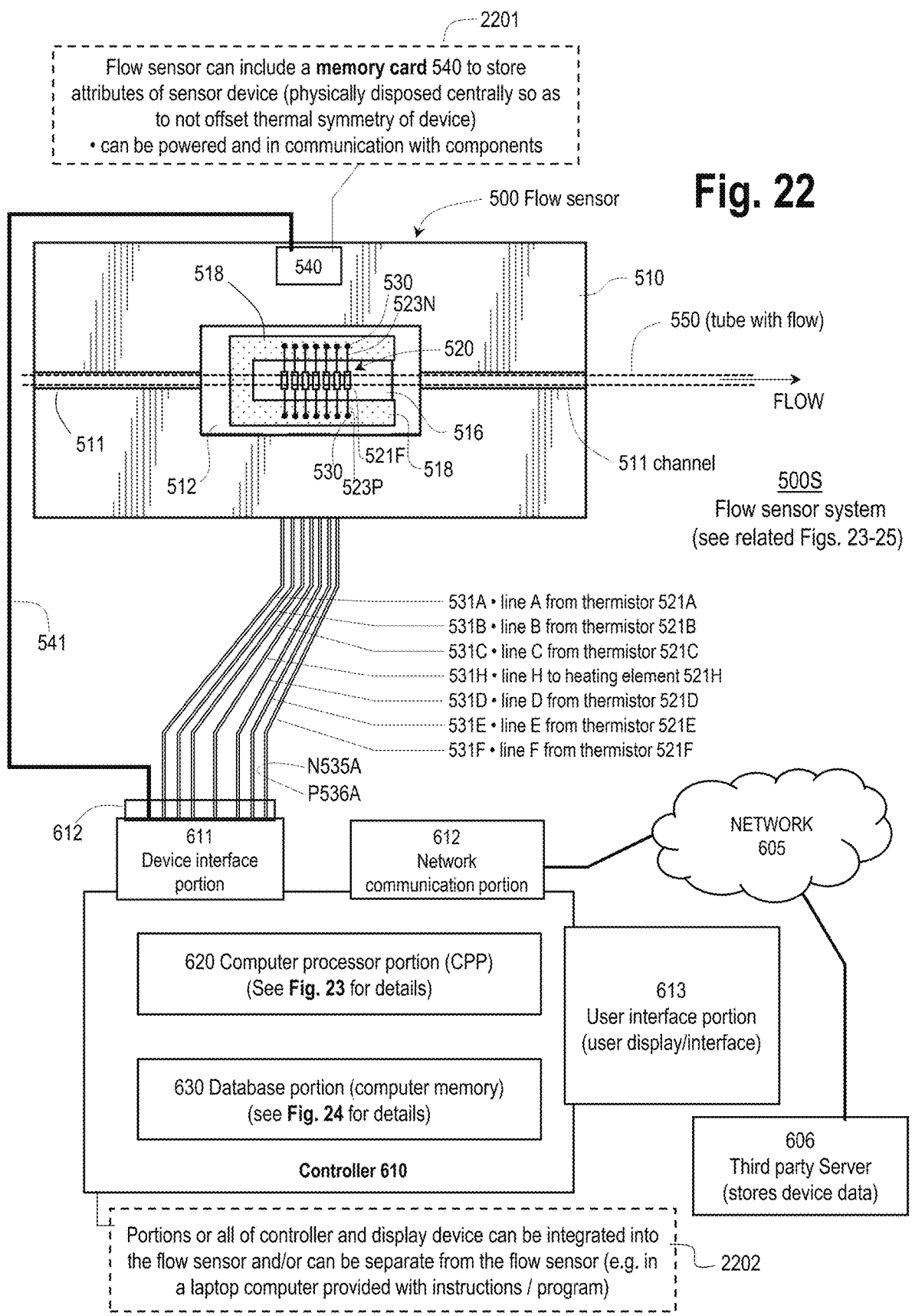
FIG. 21 is a table showing delta temperature values, in accordance with principles of the disclosure.

In further explanation the processing of step 41, FIG. 21 is a table 2100 of known trial data, i.e. known trial data ("KT" data), that can be used in the processing of step 401. The table 2100 includes a plurality of data records 2100R. The table 2100 includes a plurality of columns, i.e. fields or data fields or attributes. The fields include 2100A, 2100B, 2100C, 2100D, 2100E, 2100F, and 2100G.

As shown in FIG. 21, the table 2100 includes, in the left-hand field 2100A, an identifier for a known trial. For each data record in the table 2100 of KT data, each known trial is associated with a flow rate (field 2100B) of the known trial. For example, known trial number 52 is associated with specific delta values as shown. Further, known sample number 53 is associated with different specific delta values. The delta values of FIG. 21 can be obtained in a calibration exercise (to generate KT data) prior to operation of a flow sensor. That is, in the calibration exercise for trial 51, a syringe pump, for example, can pump liquid through the flow sensor at a rate of 5.1 ML/min. Accordingly, the flow rate is known. In conjunction with pumping the liquid through the flow sensor at a known rate, the heating element of the flow sensor can be activated so as to generate a heat pulse. The heat pulse might be for 2 seconds, for example. In this example, temperature readings can be taken from all the thermistors of the flow sensor at predetermined times after the heat pulse. For example, temperature readings can be taken every 1 second after a heat pulse, every 3 seconds after the heat pulse, every 5 seconds after the heat pulse, every 10 seconds after the heat pulse, or at any other predetermined periodicity as desired. Different tables can be generated for different amounts of time after the heat pulse. For example, the table 2100 of FIG. 21 can be generated 20 seconds after heat pulse. Relatedly, in actual operation of the flow sensor, table 2100 can be used in processing observed data taken 20 seconds after heat pulse in actual operation of the flow sensor. When a further set of observed data is input at 25 seconds after heat pulse, then a further table can be utilized that was generated at a corresponding time, i.e. 25 seconds after heat pulse, in the calibration. That is, in at least some embodiments, a known trial data table, such as table 2100, can be compared with observed data that is input the same amount of time after heat pulse. In other words, a known trial data table can be compared with a corresponding set of observed data, with such correspondence based on the amount of time after the heat pulse.

With further reference to step 401 (of FIG. 20), the delta value to be considered in the processing of step 401 might be Delta A-B. Such observed delta value represents the difference in temperature between thermistor A and thermistor B at a particular point in time (20 seconds after heat pulse in this example), as observed in the operation of the flow sensor. Accordingly, in the processing of step 401, the controller compares such observed delta A-B value with each Delta A-B value in Table 2100. Based on such comparison, the controller determines, for each known sample, a "compare value". Accordingly, if there are 500 known samples, then there will be 500 compare values.

After step 401 of FIG. 20, the process passes onto step 402. In step 402, the controller makes a determination of whether there is a further delta dataset to be used in the processing. As noted at 401", a "delta value dataset" can include a value that represents the delta, i.e. temperature difference, between two different thermistors. The delta value data set can also include the thermistor values that were used to generate the temperature difference value. Accordingly, in other words, in step 402, the controller determines if there is a further pair of thermistors to analyze in the determination of flow rate.

If yes in step 402, then the process passes onto step 403. In step 403, in similar manner to step 401, the controller compares a next delta value (for a next thermistor pair to be considered) to different corresponding values of trial data (Table 2100) for different flow rates. In similar manner to step 401, based on such comparison, the controller determines and saves respective "compare values". Also, in similar manner to step 401, in step 403, the controller can use trial data (such as is shown in table 2100) that corresponds (in amount of time after heat pulse) to the time after heat pulse of the observed data. In this example, the observed data was input 20 seconds after heat pulse and the data of table 2100 was taken 20 seconds after heat pulse. The next delta value (analyzed in the processing of step 4 3) might be the delta B-C value. Accordingly, in the processing of step 403, the controller compares such observed delta B-C value with each delta B-C value in column 2100D of Table 2100. Based on such comparison, the controller determines, for each known sample, a "compare value". Accordingly, if there are 500 known samples, then there will be 500 compare values.

With further reference to FIG. 20, at a point in the processing, the determination of step 402 will render a no. That is, at a point in the processing, there will be no further delta values to be used in the processing. In other words, there will be no further delta values, between thermistors (of a thermistor pair), to be used in the processing of subroutine 400 of FIG. 20. Upon the controller determining that there are no further delta values to be processed, the process passes from step 402 onto step 404.

In step 404, the controller can perform "closeness of match" processing using the compare values for each thermistor pair. That is, as noted at 405', the controller can utilize a difference function computed across the full range of flow values to be tested for. Table 2100 represents such full range of flow values to be tested for. The difference function can be, for example, a least means square error function. Accordingly, in step 404, the controller generates a difference value for each trial, i.e. for each known flow rate, of table 2100. Such difference values represent, respectively, a level of correspondence between each known flow rate (of table 2100) and the observed data of a delta value dataset.

Relatedly, in step 405 of FIG. 20, the controller determines the best estimate for flow rate, i.e. the flow rate currently being observed by the flow sensor, based on which trial has the lowest difference value. In other words, as noted at 405'', the best estimate for flow through the tube is given by the flow yielding the smallest value of the difference function across the entire range of flows (of table 2100, for example).

For example, it could be that the delta value for each thermistor pair (in the observed data) exactly matches with one of the known flow rates of table 2100. Say, for example, that the delta value for each thermistor pair (in the observed data) exactly matches with corresponding delta values (for each thermistor pair) of trial number 53 of table 2100. As a result, the controller would output a flow rate of 5.3 ML/min. Relatedly, if there was a perfect match between the observed data and the known trial data, then the difference function would yield a value of zero (0). However, in actual practice, there may well not be a perfect match between the delta values of observed data vis-à-vis the delta values of a particular known flow. As a result, the controller determines which known flow rate (table 2100) most closely corresponds with the data of the observed flow rate. That is, which known flow rate yielded the smallest value of the difference function. Whatever known flow rate yielded the smallest value of the difference function will be deemed the best estimate for flow rate of the observed flow.

With further reference to FIG. 20, after the processing of step 405, the process passes onto step 406. In step 406, processing passes to step 384 of FIG. 16.

FIG. 21 is a table 2100 showing delta temperature values. As noted at 2100', for example, the table of FIG. 21 shows data taken some particular time, e.g. 20 seconds, after heat pulse. That is, a sample of observed data taken 20 seconds after heat pulse can be compared with the data of table 2100 of FIG. 21. That is, a further sample of observed data, taken for example, at 21 seconds after heat pulse, can be compared with a separate table.

With further reference to FIG. 21, as noted at 2100'', the indicia ###(in Table 2100) symbolically represents a delta value between the particular sensors. For example, if the input temperature of (TA=73.4) and the input temperature of (TB=73.9), then the delta value between such two thermistors would be 0.5).

With further reference to FIG. 21, delta values of each trial (e.g. trial 1, 50, 51, 52, 53, 54, 55 as shown) are compared with corresponding delta values of the observed data—to determine which trial has the closest match (to the observed data). For example, the delta values in the observed data (obtained from a current flow of liquid) could match up very closely with trial 52. That is, trial 52 could be determined, by the controller, to be the closest match to the observed data. Upon determining the trial 52 is a closest match, the controller then determines what flow rate is associated with the trial 52. In this example, that flow rate is 5.2 ML/minute. Accordingly, the controller would output such identified flow rate as an estimate for the observed flow rate.

FIG. 22 is a schematic diagram showing a flow sensor system 600S in accordance with at least one embodiment of the disclosure. FIG. 22B is a further schematic diagram showing select components of the flow sensor system 500S. As shown in FIG. 22, the flow sensor system 500S includes a flow sensor 500. The flow sensor 500, in the embodiment shown in FIG. 22, is in communication with the controller 610.

The flow sensor includes a shell 510. For example, the shell 510 can be constructed of ceramic material that can function as a heat sink. The shell 10 can be in the form of a half barrel as described above, for example. The shell 10 can be complementary to a second shell. The shell 10 can include a channel or groove 511. As shown, the channel 511 can be composed of channels on opposing sides of a cavity 512. The cavity 512 can be formed as a recess or cavity in the shell 510. The cavity 512 can be sized so as to receive a mount board 518 on which a component assembly 520 is mounted. The component assembly 520 can include a plurality of thermistors and a thermal energy source. In the embodiment of FIG. 22, the thermal energy source is a heater, i.e. a heating element 521H, in other embodiments, the energy source could alternatively be a cooling element or cooling mechanism.

Accordingly, as shown in FIG. 22 and FIG. 22B, the flow sensor 500 includes the heating element 521H. The flow sensor system 500S also includes a plurality of thermistors upstream of the heating element 521H and a plurality of thermistors downstream from the heating element 521H.

More specifically, the flow sensor system 500S includes 3 thermistors upstream of the heating element 521H, including thermistor 521A, thermistor 521B, and thermistor 521C. Also, the flow sensor system 500S includes 3 thermistors downstream of the heating element 521H. Such three thermistors include thermistor 521 D, thermistor 521 E, and thermistor 521 F. The thermistors can, respectively, measure temperature that each respective thermistor observes, i.e. temperature that each thermistor is respectively exposed to. Relatedly, the flow sensor system 500S can be constructed so that the components of the component assembly 520 are adjacent to and in contact with a tube 550. The tube 550 provides a conduit through which fluid flows. It is such flow of fluid that is to be measured by the flow sensor.

As described above, the shell 510 can include a cavity 512. For example, the cavity 512 can be square or rectangular. The cavity 512 can receive a base thermal insulator 515. The base thermal insulator 515 can be sized so as to be geometrically similar to the cavity 512 so as to be well received into and/or be snugly received into the cavity 512. The mount board 518 can be mounted onto the base thermal insulator 515, for example by adhesive or mechanical fastener, for example.

The mount board 518 can be in the form of a circuit board (PCB) with traces or a circuit board substrate. The PCB or circuit board substrate can support various electrical components of the flow sensor. The mount board 518 can be non-conductive material so as to provide a base upon which electrical components, leads, or traces can be provided. Accordingly, the various components of the component assembly 512 can be affixed to and/or integrated into the mount board 518. More specifically, each thermistor can be attached to and/or include a positive lead or whisker 522P and a negative whisker or lead 522N. Such whiskers can extend between the thermistor and a corresponding attachment pad or connector 530 on the mount board 518. For example, such connector 530 can be a soldered spot or pad 530 on the mount board 518. Such connector 530 can be constituted by and/or can be connected to a "trace" of the circuit board. As schematically illustrated in FIG. 22B, each connector 530 can be in electrical connection with a respective wire, via each respective connector 530, so as to connect each thermistor, including positive and negative leads, with the controller 610.

It is appreciated that the various components of the flow sensor can be arranged in different manner as may be desired. However, it may well be desired that the heating element (or cooling element) and the thermistors be in physical contact with the tube 550 so as to provide desired heat transfer therebetween. For example, one arrangement can include both a board for electrical and mechanical contacts for the heating resistor and the thermistors (i.e. a 'sensor element board') and a board on which the sensor element board sits (i.e. a 'sensor array mount board').

FIG. 22B shows such connections with the controller. Specifically, a positive lead of the thermistor 521A is connected to positive wire 535A that connects the positive lead of the thermistor 521A with the controller. Further, a negative lead of the thermistor 521A is connected to negative wire 536A that connects the negative lead of the thermistor 521A with the controller. The positive wire 535A and the negative wire 536A can collectively be described as a line or composite wire 531A via which the thermistor 521A is in electrical communication with the controller 610. Such electrical connections are illustrated in FIG. 22 and in FIG. 22B.

In similar manner, a positive lead of the thermistor 521B is connected to positive wire 535B that connects the positive lead of the thermistor 521B with the controller. Further, a negative lead of the thermistor 521B is connected to negative wire 536B that connects the negative lead of the thermistor 521B with the controller. The positive wire 535B and the negative wire 536B can collectively be described as a line or composite wire 531B via which the thermistor 521B is in electrical communication with the controller 610.

In similar manner, a positive lead of the thermistor 521C is connected to positive wire 535C that connects the positive lead of the thermistor 521C with the controller. Further, a negative lead of the thermistor 521C is connected to negative wire 536C that connects the negative lead of the thermistor 521C with the controller. The positive wire 535C and the negative wire 536C can collectively be described as a line or composite wire 531C via which the thermistor 521B is in electrical communication with the controller 610.

In similar manner, a positive lead of the thermistor 521D is connected to positive wire 535D that connects the positive lead of the thermistor 521D with the controller. Further, a negative lead of the thermistor 521D is connected to negative wire 536D that connects the negative lead of the thermistor 521D with the controller. The positive wire 535D and the negative wire 536D can collectively be described as a line or composite wire 531D via which the thermistor 521D is in electrical communication with the controller 610.

In similar manner, a positive lead of the thermistor 521E is connected to positive wire 535E that connects the positive lead of the thermistor 521E with the controller. Further, a negative lead of the thermistor 521E is connected to negative wire 536E that connects the negative lead of the thermistor 521E with the controller. The positive wire 535E and the negative wire 536E can collectively be described as a line or composite wire 531E via which the thermistor 521E is in electrical communication with the controller 610.

In similar manner, a positive lead of the thermistor 521F is connected to positive wire 535F that connects the positive lead of the thermistor 521F with the controller. Further, a negative lead of the thermistor 521F is connected to negative wire 536F that connects the negative lead of the thermistor 521F with the controller. The positive wire 535F and the negative wire 536F can collectively be described as a line or composite wire 531F via which the thermistor 521F is in electrical communication with the controller 610.

In similar manner, a positive lead of the heating element 521H is connected to positive wire 535H that connects the positive lead of the heating element 521H with the controller. Further, a negative lead of the heating element 521H is connected to negative wire 536H that connects the negative lead of the heating element 521H with the controller. The positive wire 535H and the negative wire 536H can collectively be described as a line or composite wire 531H via which the heating element 521H is in electrical communication with the controller 610.

FIG. 22B shows legend 22B'. Such legend reflects that lines, representative of respective wires, that cross at right angles are understood to "not" be connected. Such legend is provided for clarity and understanding of the schematic diagram or circuit diagram of FIG. 22B.

As shown in FIG. 22 and in FIG. 22B, the controller 610 can include a device interface portion 612. The device interface portion 612 can serve to connect the controller 610 with the various wires, i.e., electrical connections, of the flow sensor 500. For example, the device interface portion 611 can include and/or interface with a wire harness 612. The wire harness 612 can include respective pins that mate or interface with receiving slots or apertures so as to provide the various connections between the controller 610 and the flow sensor 500.

As noted at 2201, the flow device or flow sensor 500 can, in at least one embodiment, include a memory card 540. The memory card 540 can store various attributes, operational data, and/or other data related to the flow sensor 500. For example, the memory card 540 can store a model number or other identifying attributes of the flow sensor 500. Based on such data, the controller 610 can "know" or determine the particulars of the particular flow sensor 500 that is connected to or plugged into the controller 610. It is this data that can be retrieved in the processing of step 302 and related processing as described herein.

The memory card 540 can be physically positioned and/or physically constructed so as to not disrupt the thermal symmetry and/or other thermal properties of the flow sensor 500. For example, the memory card 540 can be disposed in a central location so as to not disrupt the thermal symmetry of the flow sensor 500. The memory card may be mounted on the outside of the shell, for example. The memory card 540 can be in electrical and data communication with the controller 610 via a composite wire 541, as shown in FIG. 22. In general, any of the components described herein, in this disclosure, can be in electrical communication and can be in data communication with any other component described herein. Further, any of the components described herein can be suitably powered such as by a source of battery power, alternating current (AC), and/or any other power source that may be desired. For example, the controller 610 can be plugged into a suitable AC power source, and in turn the controller 610 power the various components that are attached to the controller. Accordingly, the controller can power the flow sensor 500.

In the embodiment shown in FIG. 22, the controller 610 is shown as a separate physical component as compared to the flow sensor 500. However, it is appreciated that all of the controller 610 can be physically integrated with the flow sensor 500, select parts of the controller 610 can be physically integrated with the flow sensor 500, or none of the controller 610 can be integrated with the flow sensor 500. For example, the flow sensor 500 can include some components and other components be provided by the external controller 610. Further, the controller 610 can be integrated into a laptop computer or some other computer. The controller 610, in part or in whole, can be constituted by a program or application running on a suitable computer system, such as a laptop computer or a smart phone. Accordingly, as noted at 2202, portions or all of the controller and display device or user interface 613 can be integrated into the flow sensor and/or can be separate from the flow sensor, such as for example in a laptop computer provided with instructions in a program.

With further reference to FIG. 22, in at least one embodiment of the disclosure, the controller 610 can include a computer processor portion (CPP) 620. Details of the processor or CPP 620, which can be in the form of and/or described as a computer processing unit (CPU) or computer processor (CP) for example, are described with reference to FIG. 24 below. Further, the controller 610 includes a database portion or database 630. The database 630 can be in the form of computer memory. Details of the database 630 are described below with reference to FIG. 25.

As shown in FIG. 22, the controller 610 can include or be connected to a user interface portion, user interface or user display 613. The user interface 613 can be provided so as to allow the controller 610 to output data to a user and/or input data from a user. Such a user might be a human user or a user in the form of another processor or processing system.

The controller 610 can include or be connected to a network communication portion 612. The network communication portion 612 can be in communication with a network 605. The network 605 can be in communication with a variety of resources, such as one or more third-party servers 606. Such third-party servers 606 can store various data associated with the use and operation of the flow sensor 500. For example, the third-party server 606 can store operational data and attributes of the flow sensor 500. For example, when a flow sensor 500 is "hooked up" to the controller 610, the controller 610 can input a model number from the memory card 540 of the flow sensor 500. The controller 610 can then interface with the server 606 so as to provide, to the server 606, the model number of the attached flow sensor 500. The server 606, based on data stores therein, can then map the model number to any operating attributes or data that may be needed for the controller to operate and interface with the particular flow sensor 500. Alternatively, operational data and attributes of a particular flow sensor 500 can be stored in the flow sensor itself, such as in a memory card 540. Alternatively, operational data and attributes might be stored in the database 630 of the controller 610.

FIG. 23 is a schematic diagram of operating components of the component assembly 520 of FIG. 22 and FIG. 22B. As described above, the flow sensor 500 can include a thermal element, such as a heating element 521H. Further, the flow sensor 500 can include thermistors 521A (that can be represented as "TA"), 521B (TB), and 521C (TC). The flow sensor can include thermistors 521D (TD), 521A (TA), and 521F (TF). Such operating components can be positioned adjacent and in physical contact with a tube 550 that provides for the flow of fluid. As described herein, the flow sensor 500 can monitor flow rate of the fluid passing through the tube 550.

In accordance with one embodiment of the disclosure, the processing performed by the controller 610 can compare data from different "pairs" of thermistors. A first thermistor pair 571 (as shown in FIG. 23) can include TA and TF. A second thermistor pair 572 can include TB and TE. A third thermistor pair 573 can include TC and TD. Hereinafter, further details of the processing of the controller 610 and operation of the flow sensor 500 will be described with reference to FIGS. 22-23.

Figure 24:
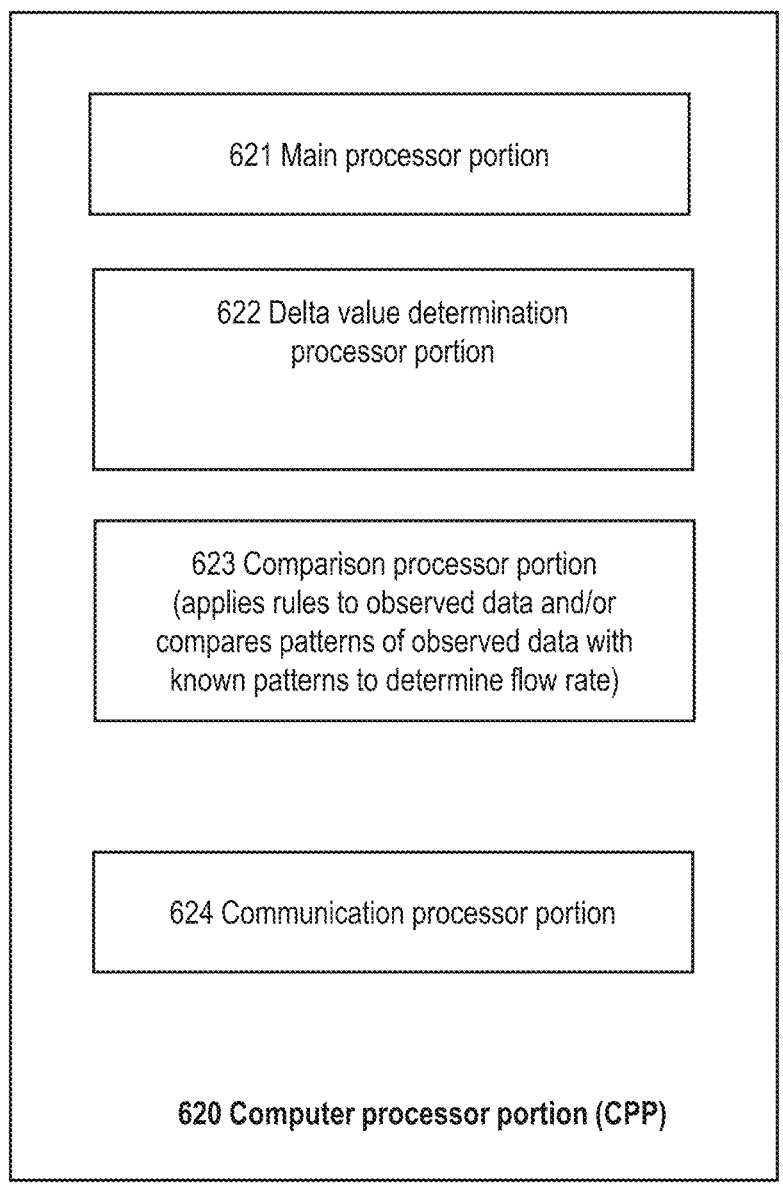
FIG. 24 is a block diagram showing further details of the computer processor portion (CPP) of the controller of FIG. 22, in accordance with principles of the disclosure.

FIG. 24 is a block diagram showing further details of the computer processor portion (CPP) of the controller 610. As shown, the CPU 620 includes a main processor portion 621. Such processor 621 can handle processing not otherwise handled by the more specialized processing components of the CPP 620.

The CPP 620 can also include a delta value determination processor portion 622. Such processor portion 622 can perform various processing including the input of temperature data and the determination of the delta values between such input temperature data. The processing portion 622 can handle various related processing as described herein.

The CPP 620 can also include a comparison processor portion 623. The comparison processor portion 623 can apply rules to observed data so as to generate an estimated flow rate based on observed data. The comparison processor portion 623 can also compare patterns of observed data with known patterns, of known trial data (KT data) so as to determine flow rate, as described herein. The comparison processor portion 623 can perform various processing relating to spline interpolates, as described herein, to determine flow rate based on observed data.

The CPP 620 can also include a communication processor portion 624. The communication process portion 624 can handle various processing relating to the controller 610 interfacing with a flow sensor and/or components of the flow sensor. The processor portion 624 can also handle various communications with external resources, for example.

Figure 25:
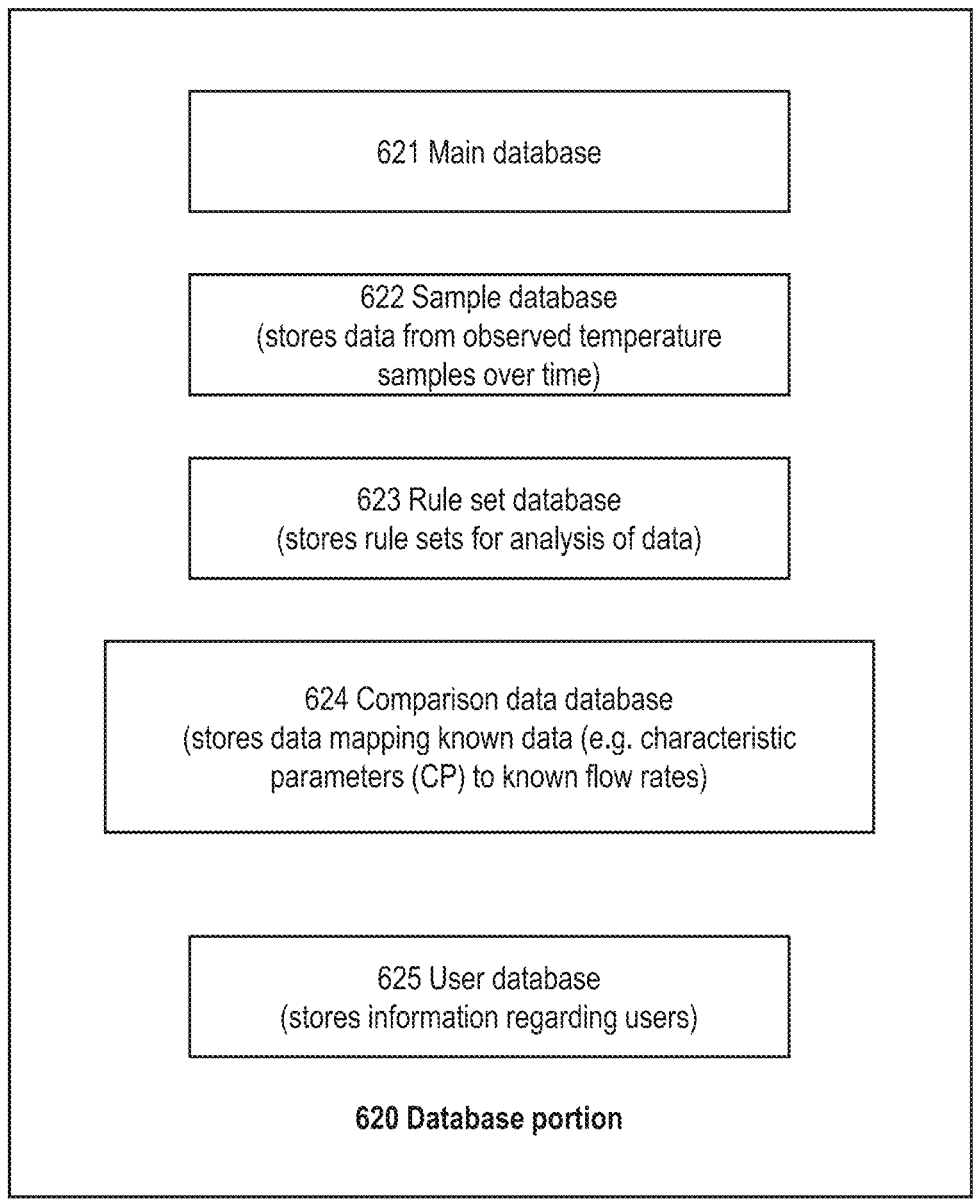
FIG. 25 is a block diagram showing further details of the database portion or database of the controller of FIG. 22, in accordance with principles of the disclosure.

FIG. 25 is a block diagram showing further details of the database portion or database 630 of the controller 610. As shown, the database portion 620 can include a main database 621. The main database 621 can store various data used by and/or generated by the CPP 620. The database portion 620 can include a sample database 622. The sample database 622 can store data from observed temperature samples over time.

The database portion 620 can also include a rule set database 623. The rule set database 623 can store rule sets for analysis of observed temperature data.

Further, the database portion 620 can include a comparison data database 624. The comparison data database 624 can store data that maps known data, such as characteristic parameters, to known flow rates. That is, in particular, the comparison data database 624 can store known trial data (KT data), as described herein.

The database portion 620 can also include a user database 625. Such user database 625 can store various information regarding particular users of a flow sensor system 500S. For example, such user database 625 can contain profile data regarding preferences of a particular user. For example, such preferences might be the particular units of flow rate that the user prefers.

Figure 26:
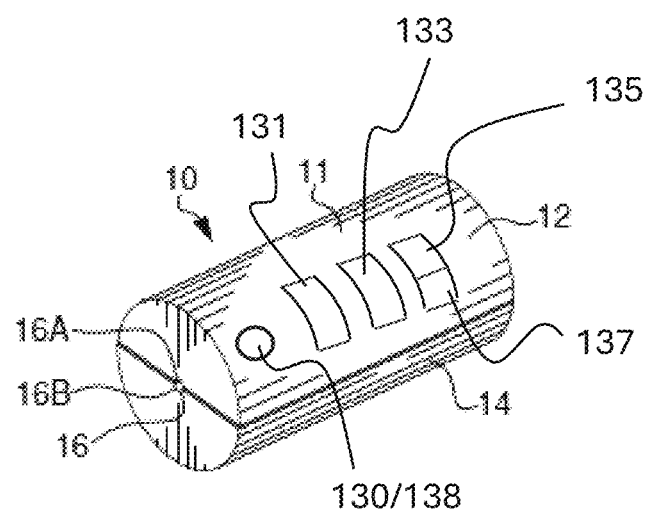
FIG. 26 is a perspective view of another embodiment of a fluid flow measuring apparatus made in accordance with principles of the disclosed subject matter.

FIG. 26 depicts another embodiment of a fluid flow measuring or detecting apparatus made in accordance with principles of the disclosed subject matter. The fluid flow measuring or detecting apparatus can be configured as a sensor device 10 having a housing 11 including an upper shell 12 and a lower shell 14 through which a through-hole 16 extends along a central and/or longitudinal axis thereof. The upper shell 12 and lower shell 14 can be configured as a heat sink/thermal buffer/stabilizer. For example, each shell 12, 14 can be made from aluminum. In this embodiment, the upper shell 12 and lower shell 14 can be configured and connected to each other in a similar manner as described above with respect to the first described embodiment. The through-hole 16 in the sensor device 10 can be configured to closely mate with a tube or conduit 171 that runs through the sensor device 10. Sensors 30A-F and thermal source 40 and associated connective structures and methods can be configured in the housing in a manner similar to or the same as described above with respect to other embodiments.

A controller 130 and battery 138 can be located in the housing 11 of the sensor device 10 such that the sensor device 10 is configured as a stand alone unit that can be easily moved from location to location, and clipped onto or otherwise attached to a fluid line 171 for which measurement of fluid flow characteristics is desired. The controller 130 can include hardware and/or software configured to perform the functions described above to operate the sensor device 10. In particular, the controller 130 can be configured to send/receive signals and/or power to the sensors 30A-F and thermal source 20 in a manner similar or identical to the manner described above with respect to the embodiments associated with FIGS. 1-25. However, in the present exemplary embodiment, an alarm device can be provided for alarming when an alarm characteristic is determined by the controller 130. For example, an alarm characteristic can be determined when zero fluid flow passing through the tube 171 is measured or detected, such as when an occlusion occurs in the fluid line/tube 171, or when the tube 171 is pinched, or when fluid supply runs out or is turned off. Alternatively, an alarm characteristic can be determined when a reversed fluid flow passing through the tube is measured or detected, such as when a fluid pump is reversed, or gravitational orientation is changed, or other event that might reverse flow of fluid in tube 171. An alarm characteristic might also be present when fluid flow passing through the tube 171 is different from a prescribed fluid flow, such as when a doctor prescribes 0.1 ml/hr of a fluid and the sensor device 10 detects or measures 0.15 ml/hr of fluid flow. The amount of deviation of fluid flow from a prescribed fluid flow required to cause an alarm characteristic to be present can be set by either a user or at the factory. It is contemplated that the controller 130 can be programmed at the factory with tolerances from targeted fluid flow, or a wired or wireless connection can be provided to allow a user to program a permissible tolerance from a targeted or prescribed fluid flow (once a permissible tolerance is exceeded, an alarm characteristic is determined for the fluid flow, and an alarm can be activated).

An alarm device (or devices) can be incorporated in the housing 11 of the sensor device 10 to notify a user (or other person or system) that an alarm characteristic of the fluid flow has been detected by the controller 130. For example, an audio device 131, a display 133, a fragrance dispensing device 135, and/or a haptic device 137 can be provided in or adjacent the housing 11 to provide an alarm that notifies the user/system when the alarm characteristic is present in the fluid flow line 171. Thus, an audible alarm (e.g., noise or voice from a speaker), a visual alarm (e.g., text or flash or image or video output on the display 133), a haptic alarm (e.g., motion or vibration from a motor, solenoid, or unbalanced spinning weight), and/or a fragrance (e.g., from a spray or diode or other fragrance emitting device) can be emitted/produced/displayed from the alarm device when the fluid flow stops, reverses, or is simply not within prescribed, set, or expected parameters. The alarm signal produced by the controller 130 when an alarm characteristic is detected can be a communication signal supplied to the alarm device. The alarm device would then actuate based on the information contained in the communication signal. Alternatively, the alarm signal from the controller 130 can be an electric signal connected to the alarm device(s) that actuates the alarm device(s).

As described with respect to FIG. 26, the sensor device 10 can be configured as a clip-on stand-alone system with all electronics integrated in the sensor housing 11.

Figure 27:
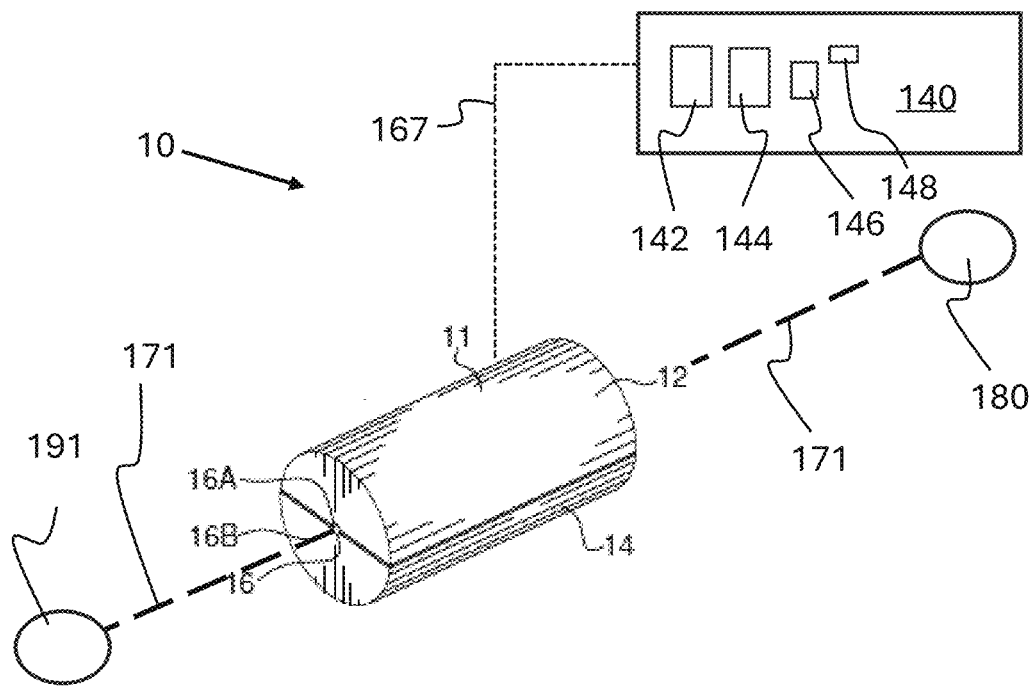
FIG. 27 is a perspective view of yet another embodiment of a fluid flow measuring apparatus made in accordance with principles of the disclosed subject matter.

In another embodiment, as shown in FIG. 27, a fluid flow measuring or detecting apparatus can be configured as a sensor device 10 having a housing 11 including an upper shell 12, a lower shell 14, sensors 30A-F and thermal source 40 (not shown) as described in the above embodiments. However, in this embodiment, a controller 140 and/or alarm device(s) can be spaced from the housing 11 of the sensor device 10 and connected thereto by a wire or wireless connection 167. The wired connection can either directly connect the sensors 30A-F and/or thermal source 40 to the controller 140, or can connect a controller 130 located in the housing 11 to the controller 140 (in which case, the sensors 30A-F and/or thermal source 40 can be connected directly to the controller 130 instead of to the controller 140). The controller 130 and/or controller 140 can be equipped with an input device such as a keyboard or microphone. Thus, a user can set alarm characteristics which, upon detection by the sensor device 10, will cause the alarm device(s) to actuate. The alarm devices can be actuated in unison or in incremental order over a period of time, or in increments and types depending on a value of the alarm characteristic. For example, if the fluid flow is at zero or otherwise occluded, a predetermined type or sequence of outputs can be sent from one or both of the controllers 130, 140 to the alarm device(s) 142, 144, 146, 148 to alert a user or system to the zero flow or occlusion status. A different type or sequence of outputs can be sent from one or both of the controllers 130, 140 to the alarm device(s) when reverse flow or unprescribed fluid flow is detected in the fluid line 171.

The fluid line 171 can extend from a fluid source 180 via a through hole 16 in the housing 11 of the sensor device 10 to a fluid recipient 191. The fluid source 180 can be a fluid bag, dialysis machine, syringe, compounding device, pharmaceutical/nutraceutical container, or other fluid container. The fluid recipient can be a human patient, animal, compounding device, dialysis machine, drug dispensing machine, fluid bag, or other target structure, system or entity. The controller(s) 130 and/or 140 can be configured to operate the sensos 30A-F and thermal source 40 and then analyze information received from the sensors 30A-F and/or thermal source 40 to determine or measure characteristics of fluid flow within line 171 and to also determine an alarm characteristic of the fluid or fluid flow within tubing 171.

Figure 28:
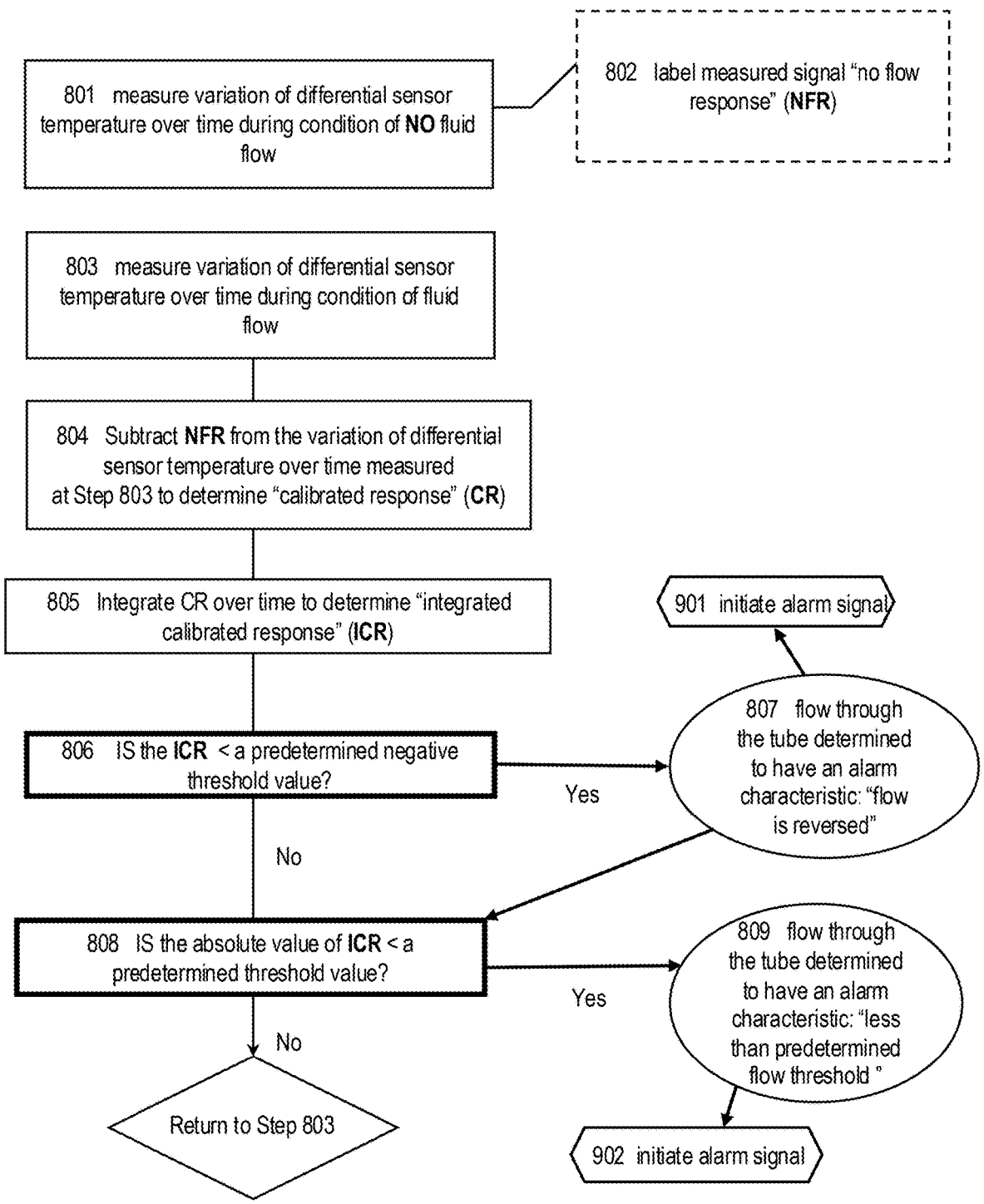
FIG. 28 is a flow chart of one exemplary method for determining a characteristic of fluid flow within a tube and alarming.

For example, as shown in FIG. 28, the controller(s) 130 and/or 140 can be configured to determine an alarm characteristic of fluid flow within tubing 171. The alarm characteristic can be a no flow characteristic such as when fluid is not moving or not present within tubing 171, or can be a reverse flow characteristic, or can be an unprescribed flow characteristic.

At step 801, a variation of differential sensor temperature from sensors (such as two or more of sensors 30A-30F) over time is measured during conditions of no flow. These measured signals can be labeled "no-flow response" (NFR) at step 802. This measurement is made during calibration of the sensor device 10 and can then be used during operation of the sensor device 10.

At Step 803 (which can immediately follow step 802 or can be initiated anytime at a later time after calibration) can take place during operation of the sensor device 10. During operation, variation of differential sensor temperature over time is measured.

At Step 804, the no-flow response NFR is subtracted from the measurement in Step 803 to determine a "calibrated response" (CR).

At Step 805, the calibrated response CR is integrated over time to determine an "integrated calibrated response" (ICR).

At Step 806, the controller determines IF the ICR is less than a predetermined negative threshold value.

If the determination at Step 806 is affirmative, the process moves to Step 807 where the flow of fluid through the tube 171 is determined to have an alarm characteristic: "flow is reversed." The process then moves to step 901 where the controller 130/140 sends an alarm signal to an alarm device(s). Simultaneously, the process can also continue from Step 807 to Step 808 to test for "no flow" or "below prescribed condition flow."

If the determination at Step 806 is negative, the process moves to Step 808 to test for "no flow" or "below prescribed condition flow" characteristics.

At Step 808 the controller determines IF the absolute value of ICR is less than a predetermined threshold.

If the determination at Step 808 is affirmative, the process moves to Step 809 where the flow fluid through the tube 171 is determined to have an alarm characteristic: "flow is less than predetermined flow threshold" and the process then moves to step 902 where the controller 130/140 sends an alarm signal to an alarm device(s).

The alarm signal can be an electrical signal that actuates an alarm device such as an audio device (speaker), display device (OLED, LED, LCD screen, LED light, text screen, or other display), haptic device (motor, vibration device), and/or fragrance emitter. Alternatively, the alarm signal can be a communication signal that causes another device or system to initiate the alarm. For example, the alarm signal can be a communication signal transmitted over WiFi, 4G, 5G or other know communication signal to a controller such as a computer or phone or other device that can accept such a signal and then communicate to the user the alarm status.

It should be understood that the structures from any of the disclosed embodiments can be interchanged, intermixed, and used together or in absence of each other. For example, the controller 140 can be a computer or cell phone, that only includes a speaker (audio device 131, 142) and display device (133, 144) for communicating the alarm status to a user.

It is contemplated that when an alarm signal is generated, a controller 130/140 could also be programmed to take corrective action as part of an alarm signal protocol. For example, the alarm signal can cause a valve to be actuated to divert supply of fluid to originate from a second fluid source 180 when a first fluid source 180 runs out or is occluded. It is also contemplated that the sensor device 10 can be configured to detect bubbles within the fluid flow in the tubing 171 and initiate an alarm signal for this alarm characteristic.

The alarm signal generated at Step 901 can be different from the alarm signal generated at Step 902 to communicate the type of alarm characteristic to a user. Alternatively, the alarm signals at Steps 901 and 902 can be the same if desired to reduce cost and efficiency.

ALTERNATIVE EMBODIMENTS

While certain embodiments of the invention are described above, it should be understood that the invention can be embodied and configured in many different ways without departing from the spirit and scope of the invention.

For example, embodiments are disclosed above in the context of a fluid sensor device 10 for use in measuring fluid flow in a pediatric or low flow pharmaceutical delivery device. However, the sensor device 10 can be used for various other applications, including: non-pediatric pharmaceutical delivery devices; nutraceutical delivery devices; pharmaceutical compounding devices; chemical delivery systems; or other systems that would benefit from a fluid flow sensor that can measure highly accurate flow rates while not being in contact or otherwise interfering with the fluid to be measured. However, the above alternative embodiments are merely provided for exemplary purposes, and as indicated above, embodiments are intended to cover any type of fluid flow sensor.

The controller 61 is shown outside of sensor device 10. However, as noted above, the controller 61 could be incorporated into the body of sensor device 10 along with a battery such that the sensor device 10 is stand alone sensor that can be clamped onto a conduit such as an IV tube, and include a display that indicates flow rate to the operator of the sensor device 10. The sensor device 10 could also be built into a wearable drug delivery device. Further, the sensor device 10 could also be configured to wirelessly (or via wire) communicate information to another separate device in the room of a user, such as an infusion pump, which then calculates flow rate of fluid using memory and/or algorithm stored in a processor of the separate device.

While shells 12 and 14 are disclosed as being made from aluminum, other materials can be used to form the body of the sensor device 10 such that it provides a heat sink characteristic as noted above. For example, the shells 12 and 14 can be multi part structures that enclose a controller and/or battery therein, or can be made from a different metal or ceramic or compositions thereof that act as a heat sink. In addition, although exemplary wire connections 63 are shown connecting the sensor device 10 to controller 61, the sensor device 10 can include a wireless transmitter that communicates data (processed or unprocessed) to a second device for further processing through Bluetooth, WIFI, or other known wireless communication technology. Thus, it is contemplated that a wire connection 63 is not necessary. The sensors 30A-F can all be the same type of sensor, or can each be different sensors or different pairs of sensors with pairs being symmetric about the thermal source 20.

The thermal source 20 can be a resistive heating element that receives pulsed energy from the controller (or other source) to cause the thermal source 20 to heat the conduit 71 (and fluid transmitted through the conduit) at set intervals and set intensities. Alternatively, the thermal source 20 can be a thermoelectric cooling chip (TEC), also known as a thermoelectric module or Peltier device, which is a solid-state device that utilizes the Peltier effect of semiconductor materials to provide active cooling or heating. The TEC can be pulsed at set intervals and set intensities such that the temperature differences can be measured upstream and downstream by the sensors 30A-F and the sensor device 10 can then calculate flow rate based on algorithms in which symmetrical relationship of the sensors 30A-F about the thermal source is used. Other known heat pump type device can be used for the thermal source 20 as well.

While the sensors 30A-F can be thermistors or other devices that output an electric voltage/current in relationship to a given temperature or temperature change, other types of sensors can be used. For example, fiber optic sensors that use White light interferometry technology could be used. In this case, fiber optic wires instead of whiskers 63A-N could be used to transmit the sensed temperature data. The fiber optic wires can provide different thermal conductance qualities to avoid or better predict heat transfer from the sensors 30A-F across the fiber optic wires/whiskers.

The fluid source as shown in FIG. 4 can be various structures and/or mechanisms configured to supply fluid to the sensor 10. For example, the fluid source can be configured as an IV bag, a fluid container, a pump, and/or combinations thereof. When the fluid source includes a pump, for example, the pump can be any of a peristaltic pump, a gravity pump, a syringe pump, a centripetal pump, a centrifugal pump, an impeller pump, a diaphragm pump, a gear pump, an infusion pump, or other know pump. In some cases, the fluid source will introduce a pulsating flow within the tube or conduit 71, such as when the fluid source includes a peristaltic pump. When a pulsating fluid flow exists within tube or conduit 71 the controllers described in the above embodiments can be configured to cause the thermal source to provide a constant thermal energy over a predetermined amount of time, and to either measure, receive or store information related to the pulsating cycle timing of the pulsating fluid. The predetermined amount of time for which the thermal source is actuated can be much larger than the time for completing a single cycle of the pulsating fluid delivered by the pump. In other words, the heat source can be actuated for a constant period of time, which can be characterized as an infinitely long pulse.

In the case where pulsating fluid flow can be measured or predicted, and the thermal source can be actuated to provide constant thermal energy, the pulsating fluid within conduit/tube 71 then provides the thermal signature (deltas) that can be measured by the upstream and downstream sensors 30A-F located symmetrically about the thermal source 20. Thus, the algorithms described with respect to the embodiments of the invention disclosed above can still be used to estimate fluid flow rates in a system in which pulsating fluid flow is present (provided the thermal source provides a constant thermal energy during processing and the pulsating cycle rate for the fluid source is known or measurable.

For example, the processes described and depicted in FIGS. 11-28 can be configured for use in a sensor system 1 that includes a fluid source that provides pulsating fluid. In step 302, for example, the device operating parameters (DOP) retrieved by the controller related to the flow device can include retrieving cycling rates for the pump or retrieving other information from which a pulsating rate can be calculated for the fluid flow. The controller might input the model number from the flow device and then access, via the Internet or other network or third-party site, information that allows obtaining/calculating the fluid pulsation cycling rate.

Step 312 can be changed to have the controller activate the thermal source (heating element or cooling element) to provide a prolonged and continuous amount of thermal energy, and to begin operation of the pump or fluid source that causes a known, measurable, or calculatable fluid pulsation cycle rate. Then, step 313 can be changed to replace "heat pulse wait time" with "pulsation cycle time" (which can be microseconds in duration), and step 321 can be eliminated. Thus, the fluid pulsation cycling rate will replace the heat pulse cycle to provide a thermal signal sensed both upstream and downstream at symmetric locations about the thermal source 20 to permit accurate predication of fluid flow rate in conduit 71.

Exemplary embodiments are intended to cover all software or computer programs capable of enabling processors to implement the above operations, designs and determinations.

What is claimed is:

1. A fluid flow measuring apparatus configured to detect a characteristic of fluid flow in a tube when the tube is located in the fluid flow measuring apparatus, comprising:
   a housing including a throughway configured to accept the tube;
   a thermal source located in the housing and adjacent the throughway;
   a first sensor positioned adjacent the throughway and spaced from the thermal source in an upstream direction;
   a second sensor positioned adjacent the throughway and spaced from the thermal source in a downstream direction such that the thermal source is located between the first sensor and second sensor, and the first sensor and second sensor are symmetrically located about the thermal source; and
   a controller connected to the first sensor and second sensor and configured to detect a characteristic of the fluid flow in the tube, wherein detection is dependent on the symmetrical relationship between the first sensor and the second sensor about the thermal source, the controller further configured to initiate an alarm signal when the characteristic of the fluid flow is an alarm characteristic of the fluid flow wherein,
   the controller is further configured to:
   measure a variation of differential sensor temperature over time during conditions of no fluid flow in the tube, to determine a no flow response value;
   measure a variation of differential sensor temperature over time during conditions of fluid flow in the tube to obtain a response value, and subtract the no flow response value from the response value, to determine a calibrated response value; and
   integrate the calibrated response value over time to determine an integrated calibrated response value.

2. The fluid flow measuring apparatus of claim 1, wherein the alarm characteristic is selected from the group consisting of the following alarm characteristics:
   zero fluid flow passing through the tube;
   reversed fluid flow passing through the tube; and
   fluid flow passing through the tube different from a prescribed fluid flow.

3. The fluid flow measuring apparatus of claim 1, further comprising:
   at least one of an audio device, a display, and a haptic device, wherein the alarm signal is at least one of an audio alarm provided by the audio device, a visual alarm provided by the display, and a haptic alarm provided by the haptic device.

4. The fluid flow measuring apparatus of claim 1, wherein the alarm signal is a communication signal configured for output to an alarm device, the alarm device configured to provide at least one of an audio alarm, visual alarm, and haptic alarm.

5. The fluid flow measuring apparatus of claim 1, wherein the controller is configured to:
   initiate the alarm signal if the integrated calibrated response value is less than a predetermined fluid flow threshold.

6. The fluid flow measuring apparatus of claim 1, further comprising:

a third sensor positioned adjacent the throughway and spaced from the thermal source in an upstream direction; and a fourth sensor positioned adjacent the throughway and spaced from the thermal source in a downstream direction such that the thermal source is located between the third sensor and fourth sensor and the first sensor, second sensor, third sensor, and fourth sensor are symmetrically located about the thermal source, wherein the controller is connected to the third sensor and fourth sensor and the detection is dependent on the symmetrical relationship between the first sensor, second sensor, third sensor, and the fourth sensor about the thermal source.

7. The fluid flow detection apparatus of claim 1, wherein the controller is connected to the thermal source and configured to provide pulsed power to the thermal source such that the thermal source provides one of heat and cooling energy for a first time period, and is turned off for a second period of time.

8. The fluid flow detection apparatus of claim 1, wherein the first sensor is a thermistor, the second sensor is a thermistor, and the thermal source is a resistive heat element.

9. The detection apparatus of claim 1, wherein the housing includes a first heat sink and a second heat sink that is detachably coupled to the first heat sink, and the first heat sink includes a concave surface configured to receive the tube through which fluid to be measured flows, and the second heat sink includes a second concave surface configured to receive the tube through which fluid to be measured flows.

10. The detection apparatus of claim 1, wherein the controller is located outside of the housing and configured to receive information from the first sensor, second sensor, and thermal source via at least one of a wire and a wireless communication channel.

11. The detection apparatus of claim 1, wherein the controller is configured to measure absence of fluid flow and direction of fluid flow utilizing the symmetrical relationship between the first sensor, second sensor, and thermal source.

12. The detection apparatus of claim 1, wherein the first sensor, second sensor, and thermal source are isolated from and do not contact the fluid to be measured.

13. A method for determining a characteristic of fluid flow in a tube, comprising:
providing a housing including a through-hole into which a tube is locatable, the housing including a thermal source located adjacent the through-hole, at least one upstream sensor located upstream of the thermal source and adjacent the through-hole, and at least one downstream sensor located downstream of the thermal source and adjacent the through-hole, the at least one upstream sensor and the at least one downstream sensor being positioned symmetrically about the thermal source;
causing the thermal source to pulse thermal energy;
measuring temperature at the upstream sensor to determine a change in temperature over time at the upstream sensor;
measuring temperature at the downstream sensor to determine a change in temperature over time at the downstream sensor;
determining the characteristic of fluid flow within the tube by,
measuring a variation of differential sensor temperature over time during a condition of zero fluid flow in the tube, to determine a zero flow response value;
measuring a variation of differential sensor temperature over time during a condition of fluid flow in the tube, to obtain a response value;
subtracting the zero flow response value from the response value, to determine a calibrated response value;
integrating the calibrated response value over time to determine an integrated calibrated response value; and
initiating an alarm signal if the integrated calibrated response value is different than a predetermined fluid flow threshold.

14. The method of claim 13, wherein the determining the characteristic of fluid flow within the tube includes using the symmetrical relationship between the at least one upstream sensor, at least one downstream sensor, and thermal source.

15. The method of claim 13, further comprising: causing an alarm signal to be initiated when the characteristic of fluid flow in the tube corresponds to an alarm characteristic, wherein the alarm characteristic is selected from the group consisting of the following alarm characteristics: zero fluid flow passing through the tube; reversed fluid flow passing through the tube; and fluid flow passing through the tube different from a prescribed fluid flow.

16. The method of claim 13, further comprising:
providing at least one of an audio device, a display, a fragrance emission device, and a haptic device, wherein initiating the alarm signal includes at least one of,
causing an audio alarm to be sounded by the audio device,
causing a visual alarm to be displayed by the display,
causing a fragrance to be emitted by the fragrance emission device, and
causing a haptic alarm to be activated by the haptic device.

17. The method of claim 13, further comprising:
initiating the alarm signal if the integrated calibrated response value is less than a predetermined fluid flow threshold.

18. A fluid flow measuring apparatus configured to detect a characteristic of fluid flow in a tube when the tube is located in the fluid flow measuring apparatus, comprising:
a housing including a throughway configured to accept the tube;
a thermal source located adjacent the throughway;
a first temperature sensor positioned adjacent the throughway and spaced from the thermal source in an upstream direction;
a second temperature sensor positioned adjacent the throughway and spaced from the thermal source in a downstream direction such that the thermal source is located between the first temperature sensor and second temperature sensor, and the first temperature sensor and the second temperature sensor are spaced symmetrically about the thermal source; and
a controller connected to the thermal source, the first temperature sensor, and the second temperature sensor, wherein the controller is configured to provide pulsed power to the thermal source such that the thermal source provides one of heating and cooling to the tube for a first time period, and is turned off for a second period of time,
the controller is further configured to
determine the characteristic of the fluid flow based on a temperature variance sensed by the first temperature sensor over time and a temperature variance sensed by the second temperature sensor over time, measure a variation of differential sensor temperature over time during conditions of a no fluid flow in the tube, to determine a no flow response value, measure a variation of differential sensor temperature over time during conditions of fluid flow in the tube to obtain a response value, and subtract the no flow response value from the response value, to determine a calibrated response value; and determine the characteristic of the fluid flow in the tube based on the symmetrical relationship between the first sensor and the second sensor about the thermal source.

19. The fluid flow measuring apparatus of claim 18, wherein the controller is configured to initiate an alarm signal when the characteristic of the fluid flow determined by the controller is an alarm characteristic of the fluid flow.

20. The fluid flow measuring apparatus of claim 19, wherein the alarm characteristic is selected from the group consisting of the following alarm characteristics:

zero fluid flow passing through the tube;

reversed fluid flow passing through the tube; and fluid flow passing through the tube different from a prescribed fluid flow.

\* \* \* \* \*